US008214240B1

(12) United States Patent
Morris et al.

(10) Patent No.: US 8,214,240 B1
(45) Date of Patent: Jul. 3, 2012

(54) METHOD AND SYSTEM FOR ALLOCATION OF RESOURCES IN A PROJECT PORTFOLIO

(75) Inventors: Sean Morris, Renmore (IE); Keith Kroeger, Renmore (IE); Thomas McGuire, Claregalway (IE); Igor Nikolaev, Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/190,894

(22) Filed: Jul. 26, 2011

Related U.S. Application Data

(63) Continuation of application No. 13/016,551, filed on Jan. 28, 2011, now Pat. No. 7,991,632.

(51) Int. Cl.
*G06Q 10/00* (2012.01)
(52) U.S. Cl. .............. 705/7.11; 705/7.12; 705/7.13; 705/7.14; 705/7.23
(58) Field of Classification Search ........ 705/7.11–7.14, 705/7.23, 36
See application file for complete search history.

(56) References Cited

U.S. PATENT DOCUMENTS

| | | | |
|---|---|---|---|
| 5,767,848 A | 6/1998 | Matsuzaki et al. | |
| 5,943,652 A * | 8/1999 | Sisley et al. | 705/7.25 |
| 6,351,734 B1 * | 2/2002 | Lautzenheiser et al. | 705/7.17 |
| 6,569,012 B2 | 5/2003 | Lydon et al. | |
| 6,892,192 B1 | 5/2005 | Geddes et al. | |
| 6,895,382 B1 | 5/2005 | Srinivasan et al. | |
| 7,349,863 B1 | 3/2008 | Pena-Mora et al. | |
| 7,506,001 B2 | 3/2009 | Johnson et al. | |
| 7,770,143 B2 | 8/2010 | Hughes | |
| 7,774,742 B2 | 8/2010 | Gupta et al. | |
| 7,835,929 B2 * | 11/2010 | Bennett | 705/7.11 |
| 7,849,438 B1 | 12/2010 | Hemmat et al. | |
| 7,873,530 B2 * | 1/2011 | Huang et al. | 705/38 |
| 7,930,201 B1 | 4/2011 | Issa et al. | |
| 7,958,494 B2 | 6/2011 | Chaar et al. | |

(Continued)

FOREIGN PATENT DOCUMENTS

JP     2000089945     3/2000

(Continued)

OTHER PUBLICATIONS

F. Ghasemzadeh, N.P. Archer "Project portfolio selection through decision support" Decision Support Systems 29_2000.73-88, Published by Elsevier Science Ltd and IPMA Accepted Feb. 24, 2000.*

(Continued)

*Primary Examiner* — Johnna Loftis
*Assistant Examiner* — Alan S Miller
(74) *Attorney, Agent, or Firm* — Proskauer Rose LLP

(57) ABSTRACT

Described are methods and apparatuses, including computer program products, for optimizing allocation of resources across projects in a project portfolio. The method includes receiving, at a computing device, (i) resource information, (ii) a portfolio of project definitions and (iii) one or more portfolio-level optimization criteria. The resource information representing a plurality of resources available for allocation to the projects, and each project definition includes a unique identifier and one or more project-level constraints. The method also includes generating, using the computing device, a plurality of project portfolio allocation scenarios and determining one or more optimized project portfolio allocation scenarios from the plurality of project portfolio allocation scenarios. Each project portfolio allocation scenario satisfies the one or more project-level constraints associated with each project definition. Each optimized project portfolio allocation scenario optimizes a sequence of the projects to satisfy the one or more portfolio-level optimization criteria.

22 Claims, 22 Drawing Sheets

U.S. PATENT DOCUMENTS

| | | | |
|---|---|---|---|
| 2002/0042731 A1 | 4/2002 | King, Jr. et al. | |
| 2002/0055832 A1 | 5/2002 | Donelan et al. | |
| 2002/0169647 A1* | 11/2002 | Newbold | 705/8 |
| 2002/0174000 A1 | 11/2002 | Katz et al. | |
| 2003/0023675 A1 | 1/2003 | Ouchi et al. | |
| 2003/0208429 A1* | 11/2003 | Bennett | 705/36 |
| 2003/0233303 A1* | 12/2003 | Elazouni | 705/36 |
| 2004/0078172 A1* | 4/2004 | Moore et al. | 703/1 |
| 2004/0181479 A1* | 9/2004 | Zosin et al. | 705/36 |
| 2004/0230468 A1* | 11/2004 | King et al. | 705/10 |
| 2004/0243968 A1 | 12/2004 | Hecksel | |
| 2004/0254959 A1* | 12/2004 | Dierksen et al. | 707/104.1 |
| 2005/0119959 A1* | 6/2005 | Eder | 705/36 |
| 2005/0223318 A1 | 10/2005 | Diesel et al. | |
| 2007/0129981 A1* | 6/2007 | Jang et al. | 705/8 |
| 2007/0168918 A1 | 7/2007 | Metherall et al. | |
| 2007/0174161 A1* | 7/2007 | Bullock et al. | 705/35 |
| 2007/0203775 A1 | 8/2007 | Busch et al. | |
| 2008/0033888 A1* | 2/2008 | Flaxer et al. | 705/36 R |
| 2008/0040364 A1 | 2/2008 | Li | |
| 2008/0147463 A1* | 6/2008 | Starling | 705/7 |
| 2008/0167930 A1* | 7/2008 | Cao et al. | 705/8 |
| 2008/0313596 A1* | 12/2008 | Kreamer et al. | 717/101 |
| 2009/0150205 A1* | 6/2009 | Tobin et al. | 705/8 |
| 2009/0192849 A1 | 7/2009 | Hughes et al. | |
| 2009/0222310 A1* | 9/2009 | Vollmer et al. | 705/8 |
| 2009/0254906 A1* | 10/2009 | Zhang et al. | 718/101 |
| 2009/0276263 A1 | 11/2009 | Deb et al. | |
| 2009/0281956 A1* | 11/2009 | An et al. | 705/36 R |
| 2010/0010856 A1 | 1/2010 | Chua et al. | |
| 2010/0076803 A1 | 3/2010 | Deo et al. | |
| 2010/0088138 A1 | 4/2010 | An et al. | |
| 2010/0115523 A1 | 5/2010 | Kuschel | |
| 2010/0174579 A1 | 7/2010 | Hughes | |
| 2010/0185547 A1 | 7/2010 | Scholar | |
| 2010/0228682 A1* | 9/2010 | Ikeda et al. | 705/348 |
| 2010/0305991 A1 | 12/2010 | Diao et al. | |

FOREIGN PATENT DOCUMENTS

| | | |
|---|---|---|
| WO | 0165456 A1 | 9/2001 |
| WO | 0226014 A2 | 4/2002 |
| WO | 2009154483 A1 | 12/2009 |

OTHER PUBLICATIONS

N.P. Archer and F Ghasemzadeh "An integrated framework for project portfolio selection" International Journal of Project Management vol. 17, No. 4, pp. 207-216, 1999.*

K.F. Doerner W.J. Gutjahr, R.F. Hartl, C. Strauss, C. Stummer "Pareto ant colony optimization with ILP preprocessing in multiobjective project portfolio selection" European Journal of Operational Research 171 (2006) 830-841 2004 Elsevier B.V.*

Chinho Lin, Ping-Jung Hsieh "A fuzzy decision support system for strategic portfolio management" Decision Support Systems 38 (2004) 383-398 2003 Elsevier B.V.*

Manfred Gilli, Evis Kellezi "Heuristic Approaches for Portfolio Optimiztion" Kluwer Academic Publishers. 2000.*

Hsing-Pei Kao, Brian Wang, James Dong, Kuo-Cheng Ku "An event-driven approach with makespan/cost tradeoff analysis for project portfolio scheduling" Computers in Industry 57 (2006) 379-397 2006 Elsevier B.V.*

K.F. Doerner, W.J. Gutjahr, R.F. Hard, C. Strauss, C. Stummer "Pareto ant colony optimization with ILP preprocessing in multiobjective project portfolio selection" European Journal of Operational Research 171 (2006) 830-841, 2004 Elsevier B.V.

Chinho Lin, Ping-Jung Hsieh "A fuzzy decision support system for strategic portfolio management" Decision Support Systems 38 (2004) 383-398, 2003 Elsevier B.V.

Hsing-Pei Kao, Brian Wang, James Dong, Kuo-Cheng Ku "An event-driven approach with makespan/cost tradeoff analysis for project portfolio scheduling" Computers in Industry 57 (2006) 379-397, 2006 Elsevier B.V.

Barreto, et al. "Staffing A Software Project: A Constraint Satisfaction and Optimization-Based Approach," Computers & Operations Research, 35 (2008), pp. 3073-3089 (17 pages).

Boverino, "How Technology Supports Project, Program and Portfolio Management," Sep. 2007, CA, 9 pages.

Brazier, et al. "A Cross-Disciplinary Software Engineering Project Implemented as a Web Service," 9th International Conference on Engineering Education, San Juan, PR, Jul. 23-28, 2006, 5 pages.

Carlson, "Implementing Project Portfolio Management in Digestible Bites," INNOTAS, 5 pages. (Retrieved Nov. 2010).

Chang, et al. "Time-Line Based Model for Software Project Scheduling With Genetic Algorithms," Information and Software Technology, 50 (2008), pp. 1142-1154 (13 pages).

Gomez, et al. "A Systematic and Lightweight Method to Identify Dependencies between User Stories," 11th International Conference on Agile Software Development, XP2010, Jan. 6, 2010-Apr. 6, 2010, Trondheim, Noruega, 6 pages.

Logue et al. "Handling Uncertainty in Agile Requirement Prioritization and Scheduling Using Statistical Simulation," In Proceedings of the Agile 2008 (AGILE '08); IEEE Computer Society, Washington, DC, USA, 2008, pp. 73-82 (10 pages).

Lonergan, "Project Management," http://managementhelp.org/plan_dec/project/project.htm, 1 page (Retrieved Nov. 2010).

Microsoft Project 2010, "Microsoft Enterprise Project Management (EPM) Solution version comparison," 2010, 11 pages.

Miller, "Portfolio Management—Linking Corporate Strategy to Project Priority and Selection," PM Solutions, Sep. 30, 1997, 6 pages.

Murray, "Portfolio, Programme and Project Management Maturity Model—a Guide to Improving Performance," Projectsmart.co.uk, 6 pages (Retrieved Nov. 2010).

Patrick, "Program Management—Turning Many Projects into Few Priorities with TOC," (Advertisement-White paper), http://www.focusedperformance.com/articles/multipm.html, Focused Performance, 1998, 5 pages.

PROJECTMANAGER.com (advertisement), http://www.projectmanager.com/project-management.php, 2 pages (Retrieved Nov. 2010).

Rodriguez, et al. "Defining Software Process Model Constraints with Rules Using OWL and SWRL," International Journal of Software, Engineering and Knowledge Engineering, vol. 20, No. 4 (2010), 16 pages.

Symons, "The ROI of Project Portfolio Management Tools for CIOs," Forrester, May 8, 2009, (13 pages).

Tip, et al. "Refactoring for Generalization Using Type Constraints," OOPSLA'03, (Oct. 2003), Anaheim, California, USA, pp. 13-26 (14 pages).

Trinidad, et al. "Automated Error Analysis for the Agilization of Feature Modeling," Journal of Systems and Software, vol. 81, Issue 6, Jun. 2008, pp. 883-896 (4 pages).

Wikipedia, "Comparison of Project Management Software," http://www.google.com/search?q=PROJECT+MANAGEMENT+System& ie=utf-8& oe=utf-8&aq=t&rls=org.mozilla:en-US:official&client=firefox-a, 5 pages (Retrieved Nov. 2010).

* cited by examiner

METHOD AND SYSTEM FOR ALLOCATION OF RESOURCES IN A PROJECT PORTFOLIO

CROSS-REFERENCE TO RELATED APPLICATIONS

This application is a continuation of U.S. patent application Ser. No. 13/016,551 filed Jan. 28, 2011, the entire contents of which are hereby incorporated by reference.

FIELD OF THE INVENTION

The invention relates generally to compute implemented methods and apparatuses, including computer program products, for project portfolio management, and more particularly, to generating different scenarios of resource allocations in a portfolio of projects based on the constraints of individual projects and optimizing scenario(s) of resource allocations to satisfy one or more optimization criteria associated with the portfolio of projects.

BACKGROUND

Project management involves, in part, planning, organizing, securing and/or managing resources to bring about the successful completion of a project with respect to specific project goals and objectives. Typically, project managers manually manage resources using techniques such as waterfall, iterative/incremental, or agile techniques. At the program or project portfolio level, especially in large organizations, multiple projects are typically more difficult to manage than managing a single project. For example, large project portfolios are typically subjected to various subjective and objective constraints coming from stakeholders (e.g., portfolio managers, project managers, and/or customers). In addition, management of project portfolios is difficult to scale due to often significant fluctuations in constraints (e.g., start/end dates) and resource availability.

In order to address issues of project portfolio management, organizations typically establish a project management office (PMO) and/or simply allocate additional resource overhead as a buffer. However, establishment and funding of a PMO and/or allocating additional resources add costs to the financial bottom line of an organization. Project portfolio managers also typically make use of commercially available software programs to assist them in the management of a project portfolio. Project management software programs typically provide reporting and analytic tools that allow the user to view project resource allocations in order to facilitate decision making. In addition, such software programs typically allow the user to manually allocate resources to projects. However, project management software programs that require the user to manually allocate resources is labor intensive, allows for single pass per criteria only, and can be prone to error.

SUMMARY OF THE INVENTION

Existing solutions tackle individual aspects of project management and thus provide an incomplete and unsatisfactory solution. Therefore, a method and apparatus that optimizes an entire portfolio of projects from both a schedule and resource utilization perspective is desirable. In addition, it is desirable that a system and method take into account both objective (hard) constraints (e.g., available resources, required start/end dates, risk, criticality, cost and return on investment weightings, etc.) and subjective (soft) constraints (e.g., specified named resources to work on projects, tolerances in delivering on all projects and meeting the required resourcing levels, etc.) to ensure that any outcome is fully aligned with the needs of the business. Finally, it is desirable that a system and method recognize the need to alter the portfolio to achieve the optimal solution, by reordering the project schedule, removing lowest priority projects to make way for higher priority projects and/or proposing changes to project staffing parameters such as skill levels and location to optimize the cost and risk associated with the portfolio of projects.

One approach to managing project portfolios is to automatically allocate resources to projects in a portfolio using project-level constraints and then determine optimized project portfolio allocation scenario(s) that satisfy one or more optimization criteria associated with the portfolio, such as a resource utilization criterion, a schedule criterion, a cost criterion, a return-on-investment (ROI) criterion, a risk level criterion, an inter-project dependency criterion, or any combination thereof.

In one aspect, there is a computerized method for optimizing allocation of resources across projects in a project portfolio. The method includes receiving, at a computing device, (i) resource information, (ii) a portfolio of project definitions and (iii) one or more portfolio-level optimization criteria. The resource information represents a plurality of resources available for allocation to the projects, and each project definition includes a unique identifier and one or more project-level constraints. The method also includes generating, using the computing device, a plurality of project portfolio allocation scenarios. Generating each project portfolio allocation scenario includes assigning a date value to each of the unique identifiers and allocating one or more of the plurality of resources to one or more of the unique identifiers. The assignment of the date values and the allocation of the resources to the one or more unique identifiers satisfies the one or more project-level constraints associated with each project definition. The method also includes determining, using the computing device, one or more optimized project portfolio allocation scenarios from the plurality of project portfolio allocation scenarios. Such determination optimizes a sequence of the projects to satisfy the one or more portfolio-level optimization criteria.

In another aspect, there is a computer program product tangibly embodied in a machine-readable storage device. The computer program product includes instructions being operable to cause a data processing apparatus to receive (i) resource information, (ii) a portfolio of project definitions, and (iii) one or more portfolio-level optimization criteria. The resource information represents a plurality of resources available for allocation to the projects, and each project definition includes a unique identifier and one or more project-level constraints. The computer program product also includes instructions being operable to cause the data processing apparatus to generate a plurality of project portfolio allocation scenarios by assigning a date value to each of the unique identifiers and allocating one or more of the plurality of resources to one or more of the unique identifiers. The assignment of the date values and the allocation of the resources to the one or more unique identifiers satisfies the one or more project-level constraints associated with each project definition. The computer program product also includes instructions being operable to cause the data processing apparatus to determine, using the data processing apparatus, one or more optimized project portfolio allocation scenarios from the plurality of project portfolio allocation scenarios. Such determination optimizes a sequence of the projects to satisfy the one or more portfolio-level optimization criteria.

In another aspect, there is a system for optimizing allocation of resources across projects in a project portfolio. The system includes means for receiving (i) resource information, (ii) a portfolio of project definitions, and (iii) one or more portfolio-level optimization criteria. The resource information represents a plurality of resources available for allocation to the projects, and each project definition includes a unique identifier and one or more project-level constraints. The system also includes means for generating a plurality of project portfolio allocation scenarios by (1) assigning a date value to each of the unique identifiers and (2) allocating one or more of the plurality of resources to one or more of the unique identifiers. The assignment of the date values and the allocation of the resources to the one or more unique identifiers satisfies the one or more project-level constraints associated with each project definition. The system also includes means for determining one or more optimized project portfolio allocation scenarios from the plurality of project portfolio allocation scenarios. The means for determining the one or more optimized project portfolio allocation scenarios optimizes a sequence of the projects to satisfy the one or more portfolio-level optimization criteria.

In other examples, any of the aspects above can include one or more of the following features. In some embodiments, determining the one or more optimized project portfolio allocation scenarios includes selecting, using the computing device, a first project portfolio allocation scenario from the plurality of the project portfolio allocation scenarios and revising, using the computing device, the sequence of the projects in the first project portfolio allocation scenario to satisfy the one or more portfolio-level optimization criteria. The allocation of the resources in the first project portfolio allocation scenario can also be changed to satisfy the one or more portfolio-level optimization criteria. In some embodiments, determining the one or more optimized project portfolio allocation scenarios includes assigning, using the computing device, a weight to each of the one or more portfolio-level optimization criteria and determining, using the computing device, the one or more optimized project portfolio allocation scenarios by satisfying the one or more portfolio-level optimization criteria scaled by their respective weights. At least one of the one or more project-level constraints, the one or more portfolio-level optimization criteria, and the weights can be defined based on one or more user inputs.

In some embodiments, the one or more project-level constraints can include: one or more start dates or date ranges, one or more end dates or date ranges, one or more resource constraints, a cost constraint, one or more location constraints, or any combination thereof. The one or more resource constraints can include human resource constraints defining one or more attribute constraints. Each project definition from the portfolio of project definitions can further include information indicating a priority level. Allocating one or more of the plurality of resources to one or more of the unique identifiers can include allocating resources to a first unique identifier before allocating resources to a second unique identifier. The first unique identifier can be associated with a first priority level higher than a second priority level associated with the second unique identifier. Assigning a date value to one of the unique identifiers can include assigning start and end date values or a null date value. The null date value can indicate that the project associated with the one of the unique identifiers is canceled or not scheduled.

In some embodiments, the one or more portfolio-level optimization criteria include: a resource utilization criterion, a schedule criterion, a risk level criterion, a cost criterion, a return-on-investment criterion, an inter-project dependency criterion, or any combination thereof. The portfolio of project definitions can include a baseline set of project definitions and a new project definition. The resource information can further include allocation information associating the plurality of resources with the baseline set of project definitions. The plurality of resources can include a set of allocated resources and one or more unallocated resources. The resource information can further include allocation information associating the set of allocated resources with the plurality of project definitions. The resource information can include baseline allocation information associating the plurality of resources with the portfolio of project definitions.

The method, system and computer program product can further include displaying, on a display device coupled to the computing device, the first project allocation scenario. The method, system and computer program product can further include generating an action plan based on the optimized project portfolio allocation scenario. The action plan includes at least one of modifying resource allocation of the plurality of resources or acquiring additional resources.

The plurality of resources can include one or more human resources, one or more physical resources, or any combination thereof. The one or more physical resources can include one or more computer resources, one or more geographic locations, one or more supply materials, one or more equipment items, or any combination thereof. The resource information can include attribute information for one or more of the plurality of resources. The attribute information can include skills information, geographic location information, language information, availability information, or any combination thereof, for one or more human resources.

In other examples, any of the features above relating to a method can be performed by a system, and/or a controller of the system, configured to or having means for performing the method. In addition, any of the features above relating to a method can be performed by a computer program product including instructions being operable to cause data processing apparatus to perform the method.

Any of the above implementations can realize one or more of the following advantages. Automatically allocating resources to project portfolios subject to project-level constraints and generating optimized scenarios that satisfy specific optimization criteria fundamentally drives efficiency and value while reducing costs. For example, organizations that are subject to schedule variations can determine more efficiently a better level of resourcing. In addition, real-time realization of resource allocation decisions, priority and/or funding can be achieved, thereby allowing the capability to quickly create and compare multiple scenarios with different business drivers to access best overall project portfolio composition. The tool can also advantageously be integrated with existing data capture and reporting tools designed to capture current resource supply and demand. Through better cost management and efficiency, the project portfolio management system can provide or achieve one or more of the following: better resource optimization through alignment of supply and demand over a given time period, facilitates potential early cancellation, prioritization of projects that benefit an organization based on superior ROI, avoid fines/penalties for regulatory based projects, optimal project scheduling based on known resource and/or other business constraints (e.g. risk, criticality, project interdependencies etc.), optimal project scheduling where resource supply changes in-flight for a portfolio of programs and projects, and optimal project scheduling where project delays impact other projects and programs in the portfolio. Managers can advantageously use the project portfolio management system to do basic optimization of resources and project releases within their control, while senior managers/executives can advantageously use the project portfolio management system to optimize larger groups of projects and programs within their portfolio.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION OF THE INVENTION

Systems and methods for project portfolio management are disclosed that allow users to generate different scenarios of resource allocations in a portfolio of projects based on the constraints of individual projects and optimize scenario(s) of resource allocations to satisfy one or more optimization criteria associated with the portfolio of projects.

In some embodiments, the project portfolio management system can be used to plan and allocate resources for a portfolio of projects that have yet to start and have yet to have any resources allocated to any of the projects. In other embodiments, the project portfolio management system can be used to modify and optimize a portfolio of projects that have yet to start, but where one or more of the projects have previously been allocated resources. For example, large project portfolios can go through a number of iterations of planning and modifications before any of the projects are approved to start. At the beginning of each iteration, resources may have been allocated to one or more projects during the previous iteration. In yet other embodiments, the project portfolio management system can be used to modify and optimize a portfolio of projects where one or more of the projects have already started (e.g., are "in-flight"). For example, an unscheduled event that requires a new project or a change in the constraints of an in-flight project may require modification in order to proceed. The number of projects in a portfolio can range from a few to hundreds or more. In some embodiments, one or more projects in a portfolio are not dependent on the success or other milestone event from one or more other projects in the portfolio.

Figure 1A:
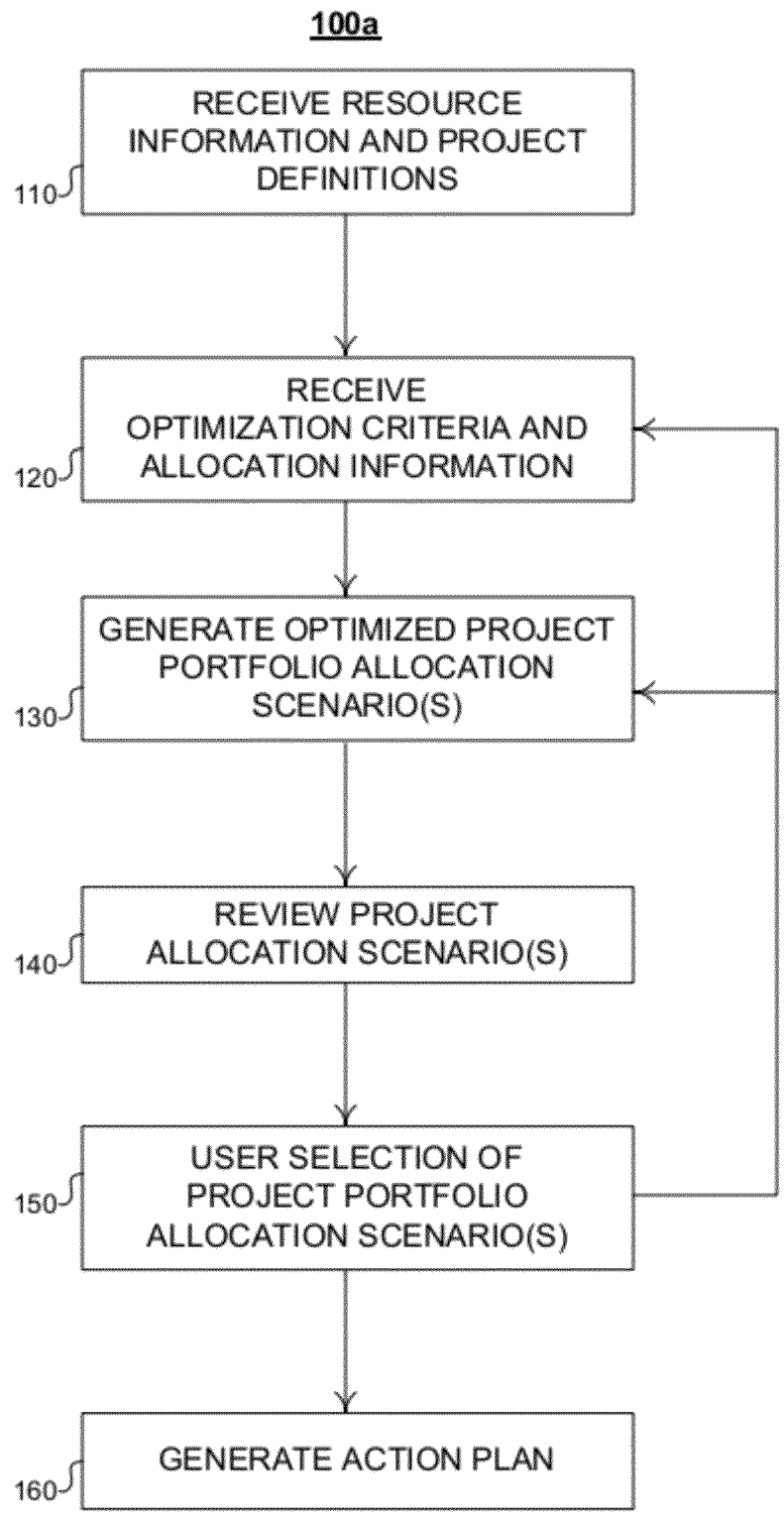
FIGS. 1A-1D are flowcharts depicting general process flow associated with the management of a project portfolio.

FIG. 1A illustrates a flowchart 100a depicting a general process flow associated with the management of a project portfolio. In particular, flowchart 100a details the workflow through which a user can interface with a project portfolio management system to support the optimization of a project portfolio. The elements of flowchart 100a are described using the exemplary project portfolio management system 200 of FIG. 2. Optimization of a project portfolio can include receiving resource information and a plurality of project definitions (110), receiving one or more optimization criteria and/or allocation information (120), generating one or more optimized project portfolio allocation scenarios (130), reviewing one or more project portfolio allocation scenarios (140), selection of at least a first project portfolio allocation scenario (150) (e.g., by a user) and/or generating an action plan (160).

Resource information that is provided to and received (110) by the project portfolio management system 200 can include information that represents resources available for allocation to one or more of the projects in the project portfolio. Similarly, project definitions that are provided to and received (110) by the project portfolio management system 200 can represent projects for which allocations of the identified resources (including, e.g., the volume or number of resources) are simulated. In general, resource information and/or project definitions can be provided and/or received (110) as a data structure such as, for example, textual lists, XML documents, class objects (e.g., instances of C++ or Java classes), other data structures, or any combination thereof. Project definitions can be provided as a set of one or more baseline (e.g., currently planned and/or existing) projects, as a set of one or more new project definitions, or any combination thereof.

Resource information can represent a plurality of resources, which can range from human personnel (e.g., computer programmers, accountants, employees, consultants, etc.) to physical resources (e.g., a computer resources, infrastructure resources such as a geographic locations or buildings/office space, any type of supply or manufacturing material, physical equipment items, etc.). Human resource information can include attribute information defining one or more of any of the following: type attributes (e.g., full-time employee, part-time employee, contractor, temp, etc.), role attributes (e.g., project manager, architect, analyst, QA engineer, database manager/administrator, computer programmer), role-level attributes (e.g., a principal role, a senior role, an entry-level role, a graduate role, etc.), skill attributes (e.g., Java, C++, or generally any knowledge/ability to undertake a required activity), geographic attributes (e.g., one or more cities/countries or other locations where person is available to work), education attributes (e.g., Ph.D., M.B.A., J.D., etc.), language attributes (e.g., French, German, etc.), cost attributes (e.g., $/hour), experience attributes (e.g., years of experience working on regulatory compliance), fungibility, human fragmentation attributes (e.g., the capability to be assigned to multiple tasks), security attributes (e.g., security clearance, etc.), criticality attributes (e.g., a measure of the importance of a human resource), and/or any combination thereof.

Physical resource information can include attribute information defining one or more of any of the following: geographic attributes (e.g., one or more locations where physical resource can be used or accessed), cost attributes (e.g., cost to use per hour, cost of supply per unit, etc.), availability attributes (e.g., information indicating times/dates and/or locations that the resource is available for use and not assigned to other projects or due for maintenance), supply attributes (e.g., amount of supply), throughput attributes (e.g., network bandwidth, system capacity, physical space, etc.), security attributes, and/or any combination thereof. In some embodiments, the plurality of resources represented by the resource information can include both human personnel and physical resources in any combination thereof.

A project is an activity that includes at least a starting date and requires at least one or more resources in order to carry out such activity. Projects vary over a wide range of types from simple activities to complex activities. Simple activities can vary from, for example, creating a web page to repairing a piece of equipment. Resources associated with these simple projects can include an HTML programmer and access to a computer for creating the web page, or a mechanic, the necessary tools and a workshop for repairing the piece of equipment. In contrast, complex activities can vary from, for example, creating a 401(K) program for a large company to constructing a large skyscraper. The resources for complex projects can easily number in the hundreds or thousands.

A project can be defined by one or more project-level constraints. For example, project-level constraints can include one or more resource constraints, schedule constraints, global resource constraints, cost constraints, risk constraints, criticality constraints, technology constraints, or any combination thereof.

A resource constraint, for example, is illustrated by the web page project discussed above, which includes a human personnel constraint (e.g., successful completion of the project is constrained by the requirement of an HTML programmer). Similarly, the web page project also includes a physical resource constraint (e.g., a computer). In general, resource constraints define what resources are required or can be used for the successful completion of a project. In some embodiments, a resource constraint can define a minimum or maximum number of resources required (e.g., at least eight Java programmers or at least one hundred hours of time on a supercomputer mainframe). Resource constraints can also specify a minimum level of experience, certification, and/or security clearance (e.g., a certified public accountant with at least five years experience). Aside from resource constraints that specify a general constraint, resource constraints can also specify a specific resource (e.g., the name of a particular person or physical resource). In general, resource constraints can be tied to or associated with any resource attribute described above.

Schedule constraints can include a start-date, an end-date (e.g., regulatory deadlines), one or more milestone date constraints, a duration constraint, and/or any combination thereof. For example, the web page project can be constrained by a regulation requirement for a business to post certain information online by a certain date. In this case, the web project's definition includes an end-date schedule constraint. In some embodiments, a schedule constraint for a project can be defined as a hard-constraint or an unchangeable constraint (e.g., for high priority projects, for projects in-flight, or for projects in which the investment therein has surpassed a threshold amount). In some embodiments, a date constraint can be made dependent from the completion of any date or event associated with another project (e.g., the completion of a milestone or completion of the other project itself).

A cost constraint, for example, can set a minimum or maximum limit on the amount of money (e.g., spent on resources) estimated to be spent on the project. A profitability constraint (e.g., a minimum limit on the profitability of a project). A criticality constraint (e.g., a priority level) can be used by the project portfolio management system 200 as a guide on how to order which projects get allocated resources (132) or assigned dates first (134). Criticality constraints can also be used to determine whether a project can be deferred if insufficient resources are available for its successful completion.

In general, any project-level constraint can be defined as a hard-constraint or as a soft-constraint. A hard-constraint can be defined such that satisfaction of the project (e.g., classifying the project as not canceled or deferred during simulation) can only be met if the hard-constraint itself is satisfied. In contrast, a soft-constraint can be defined such that a project can still be classified as satisfied during simulation even if the soft-constraint is not satisfied. Soft-constraints can be used, for example, in determining the ranking value (136) of a project portfolio allocation scenario. For example, in some embodiments satisfaction of a soft-constraint can be used as a weighting factor to increase a ranking value for a particular scenario.

At the program or project portfolio level, projects can be identified by a unique identifier (e.g., the project name, a number code, or other identifier). Accordingly, in addition to project-level constraints, a project definition can also include its unique identifier in order for a project portfolio management system to be able to reference the project.

Before, after, and/or concurrently with receiving the resource and project definitions (110), one or more optimization criteria and/or allocation information can be received by the project portfolio management system 200 (120). Allocation information can indicate the baseline state (e.g., current state) of a project portfolio represented by the received (110) project definitions and resource information. For example, the baseline state of the project can include information representing the current allocation of one or more resources and/or assignment of dates to one or more of the projects within the portfolio. Optimization criteria can represent the objectives to be achieved in determining the optimized project portfolio allocation scenarios (130). For example, a user can establish an objective, such as maximization of resource utilization, as an optimization criterion.

Figure 3:
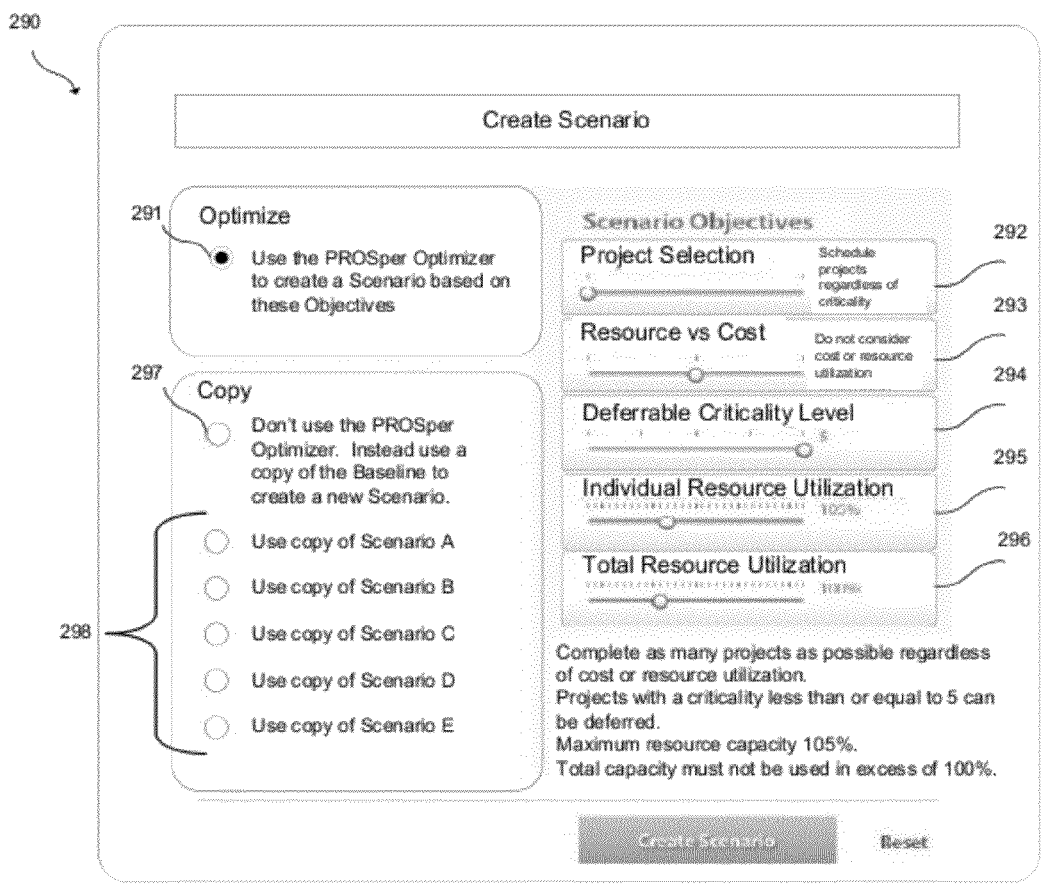
FIG. 3 illustrates a graphical user interface depicting exemplary optimization criteria selectable by a user to simulate and optimize allocation scenarios.

In general, optimization criteria and/or allocation information can be provided and/or received (120) as a data structure such as, for example, textual lists, XML documents, class objects (e.g., instances of C++ or Java classes), other data structures, or any combination thereof. FIG. 3 illustrates a graphical user interface (290) depicting exemplary optimization criteria selectable by a user to simulate and optimize allocation scenarios. In some embodiments, graphical user interface module 210 and/or user functions module 220 present the graphical user interface (290) to a user. From the graphical user interface (290), a user can choose to generate an optimized project portfolio allocation scenario by selecting an "optimize" option box (291). The user can also customize the objectives to be achieved through optimization by selecting one or more optimization criteria from a list of criteria (292-96). The optimization criteria include, for example: a "project selection" criterion (292) for allowing a user to instruct the system to schedule projects regardless of their criticality, a "resource vs cost" criterion (293) for allowing a user to instruct the system to allocate resources and/or schedule projects without considering cost or resource utilization, a "deferrable criticality level" criterion (294) for allowing a user to instruct the system to defer execution of projects with criticality levels less than or equal to a certain user-selected threshold, an "individual resource utilization" criterion (295) for allowing a user to specify the percentage of resource utilization per project, and a "total resource utilization" criterion (296) for allowing a user to specify the percentage of resource utilization across all projects in a portfolio. Selection of an optimization criterion can involve a user making a selection on a sliding scale associated with each criterion. For example, with respect to the "deferrable criticality level" criterion, a user can select a criticality threshold on a scale of 1 to 5 such that projects with criticality levels below this threshold may be deferred. In some embodiments, a user can specify different weighting factors for one or more of the optimization criteria.

The graphical user interface (290) can also provide a user with the option (297) to load a previously stored project portfolio allocation scenario and use it as the baseline scenario instead of creating a new project portfolio allocation scenario. In certain embodiments, a user can load a previously stored project portfolio allocation as well as create a new project portfolio allocation scenario. If a user chooses to load a previously stored project portfolio allocation scenario, the user can select one or more previously-created scenarios from a list of stored scenarios, such as from scenarios A-E (298) illustrated in the graphical user interface (290). In various embodiments, a user can use the graphical user interface (290) (e.g., using graphical user interface module 210 and/or user functions module 220) to manually edit (e.g., add, remove, modify) the baseline allocation/assignment of resources/dates. In various embodiments, a user can select one or more options of the graphical user interface (290) using option button(s), check box(es), text box(es), drop-down list(s), etc., or any combination thereof.

Figure 1B:
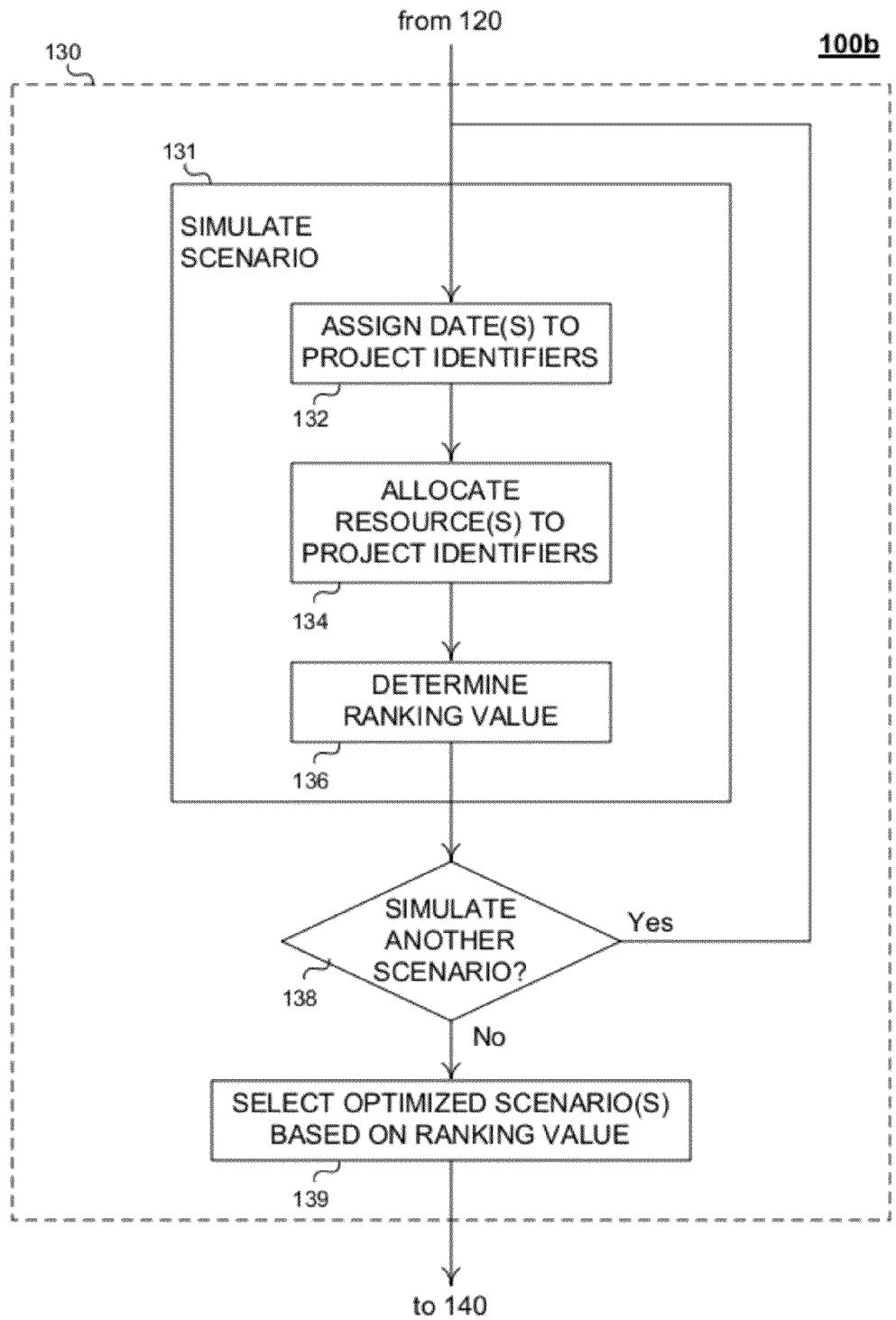

FIG. 1B illustrates a flowchart 100b depicting a general process flow associated with generating optimized project portfolio allocation scenario(s) (130) according to some embodiments. The elements of flowchart 100b can be implemented, for example, by the optimization engine 260 of FIG. 2. Generating optimized project portfolio allocation scenario(s) (130) includes, in part, simulating a single project portfolio allocation scenario (131), and can further include determining whether to simulate another project portfolio allocation scenario (138) and/or selecting one or more project portfolio allocation scenarios based on a ranking value (139). Simulating a single project portfolio allocation scenario (131) can include assigning one or more date values to project identifiers (132), allocating resources to one or more project identifiers (134), and/or determining a ranking value of the project portfolio allocation scenario based on a project portfolio valuation function (136). FIG. 1B illustrates that assignment of date(s) to project identifiers (132) occurs before allocation of resource(s) to project identifiers (134), but other process flows can be used. For example, allocation of resource(s) to project identifiers (134) can occur before or concurrently with assignment of date(s) to project identifiers (132).

Assignment of date value(s) to project identifiers (132) can be subject to any schedule-based constraint of the projects. For example, if a project has a hard-constraint start-by-date of February 1, then the project portfolio management system 200 does not assign the project identifier associated with this project a start date after February 1. Similarly, allocation of resources to project identifier(s) (134) can be subject to any project-level constraint included in the project definition associated with the respective project identifier. For example, the only human resource that can be allocated to a web page project including a hard-constraint of an HTML programmer is an HTML programmer.

In some embodiments, assigning date value(s) to project identifiers (132) and/or allocating resources to project identifier(s) (134) can occur in order from those projects with the highest criticality constraint (e.g., priority level) to those projects with the lowest criticality constraint. In some embodiments, allocating resources can occur relative to a project's cost, risk, ROI, other project characterization, or any combination thereof. If two or more projects are equal with respect to the ordering parameter, then projects can be allocated based on the order of their unique identifier. In some embodiments, if by the time the project portfolio management system 200 comes to allocating resources to a project with an associated low criticality level and it is determined that all of the constraint-compatible resources available during the project's duration have already been assigned to more critical projects, then one or more date values of the less critical project can be changed. The assignment of a date value to one of the unique identifiers can include assigning start and end dates or a null date, which indicates that the project associated with the one of the unique identifiers is canceled or not scheduled.

In general, assignment of dates (132) and/or allocation of resources (134) can be accomplished using constraint programming and/or constraint logic programming. Constraint programming generally searches for a state of a system (e.g., a project portfolio scenario) in which a large number of constraints are satisfied at the same time. Constraint programming typically states the problem as a state of the system containing a number of unknown variables. The constraint program then can search for values for all of the variables. In some embodiments, constraint programming can include temporal concurrent constraint programming (TCC), non-deterministic temporal concurrent constraint programming (NTCC), or both TCC and NTCC. Some exemplary examples of constraint logic languages are: B-Prolog, CHIP V5, Ciao Prolog, ECLiPSe, SICStus Prolog, GNU Prolog, Oz programming language, YAP Prolog, SWI Prolog, Claire programming language, Curry programming language, and Turtle programming language. The constraints used in constraint programming can be one or more specified domains (e.g., boolean domains, integer domains, rational domains, linear domains, finite domains, or any mixed combination thereof).

In some embodiments, hundreds of different project portfolio allocation scenarios can be simulated (131). After each iteration of simulating a new scenario, the optimization engine 260 can store the respective resource allocations for the most recent scenario such that any future allocation of resources and/or assignment of dates are different from what was previously simulated. For example, the optimization engine 260 can simulate (131) every permutation of assignment/allocation of dates/resources that are possible subject to the constraints of the projects within the project portfolio. In some embodiments, only a pre-determined number of project portfolio allocation scenarios need to be simulated (e.g., another scenario is simulated (138) only if a predetermined threshold number of simulations has yet to be reached).

At the completion of each simulation of a project portfolio allocation scenario (131), a ranking value for the just simulated project portfolio allocation scenario can be determined based on a project portfolio valuation function (136). In some embodiments, ranking values can be determined after all of the project portfolio allocation scenarios have been simulated (138). A project portfolio valuation function can generally define a measurement of a project portfolio allocation scenario with respect to one or more optimization criteria. Valuing project portfolio allocation scenarios (e.g., ranking the hundreds of permutations of allowable scenarios that satisfy the project constraints) advantageously allows the allocation scenarios to be listed in order of optimization defined by the valuation function.

A project portfolio valuation function can take as input a portfolio of projects, including information representing how the resources are allocated to the projects in the portfolio. A valuation measurement of a project portfolio valuation function can be with respect to one or more optimization criteria such as a resource utilization criterion (e.g., a ranking value can be proportional to the percentage that projects use all available resources within a predetermined tolerance (e.g., +/−5%), a schedule criterion (e.g., a ranking value can be inversely proportional to the time scheduled to complete projects without overshooting available resources), a risk level criterion (e.g., ranking score is based on an acceptable cumulative risk score for a given time period), a project criticality criterion, a total project portfolio cost criterion (e.g., the aggregate costs of all projects within the portfolio), a return-on-investment (ROI) criterion (e.g., expected gain from all projects minus cost of all projects), or any combination thereof. For example, if a user has selected a total project portfolio cost criterion, then each project portfolio allocation scenario is valuated with respect to a cost metric (e.g., the ranking value can be based on the aggregate cost spent on each project within one project portfolio allocation scenario). Similarly, if a user has a selected a ROI criterion, then each project portfolio allocation scenario is valuated with respect to a ROI metric (e.g., the ranking value can be based on the aggregate ROI for each project within one project portfolio allocation scenario). In yet other examples, the objective can be to determine an allocation of resources to a project portfolio such that the average project completion time is minimized. The degree that one or more objectives are achieved with respect to one or more criterion can be measured by using a project portfolio valuation function.

An exemplary valuation function for ranking project portfolio allocations based on how they satisfy a project criticality criterion is provided below:

$$\max\left\{\sum_{k=1}^{n} W[p_k] * F[p_k]\right\}, \quad \text{(Equation 1)}$$

where n represents the number of projects in a portfolio, $p_k$, represents the $k^{th}$ project, function W represents a criticality weight function, and function F represents a successful-and-on-time completion function.

Table I below lists examples of a skill criterion, in which a project portfolio valuation function is based on matching skills for open positions to available supply.

TABLE I

| Match Skills | | |
| --- | --- | --- |
| Sub Features | Additional Detail | Priority |
| Specify how close skills match should be, e.g., +/− 1 level | | High |
| Define multiple assignments for individuals who have more than one skill which is a fit for an open position | Maximum number of assignments allowed? | Low |
| Incorporate acceptable degree of fragmentation for a resource into assignment decision | Maximum number of assignments allowed. This can also be dependant on resource type e.g. 1-2 for Dev/QA; 5-7 for Architects/DBA's | Medium |
| Incorporate critical named resource for | Assumes some resources are not fungible, e.g., | Low |

TABLE I-continued

| Match Skills | | |
| --- | --- | --- |
| Sub Features | Additional Detail | Priority |
| projects into optimization | subject matter experts critical to success of project so their availability drives options for project scheduling | |

Table II below lists examples of a business outcome criterion for projects that have yet to commence.

TABLE II

| Business Outcome - Planning Stage | | |
| --- | --- | --- |
| Sub Features | Additional Detail | Priority |
| Optimize for resource utilization | Ensure that projects are scheduled in such a way as to use all available resources within agreed tolerances e.g. +/− 5% | High |
| Optimize for schedule | Schedule projects to minimize time to complete without overshooting available resources | Medium |
| Optimize for risk | Acceptable cumulative risk score for a given time period | Medium |
| Optimize for criticality | Prioritize highest criticality projects first in schedule and resourcing | Low |

Table III below lists examples of a business outcome criterion for projects that are in-flight.

TABLE III

| Business Outcome - In-Flight Projects | | |
| --- | --- | --- |
| Sub Features | Additional Detail | Priority |
| Optimize for resource utilization | Re-schedule projects not yet started and those not past certain milestones (e.g. Requirements sign-off) in such a way as to use all available resources | High |
| Optimize for Actual Cost | Based on actual costs for in flight projects versus originally planned costs, assign a rating (e.g. Cost Performance Index) and assign a defacto risk rating based on over/under run on costs. | Medium |

Optimization criteria can also include criteria based on a project-level constraint. For example, optimization can be based on a subjective or soft project-level constraint, which is one that does not prevent the allocation and/or assignment of a date to a project even if it is not met. However, when a resource and/or date is allocated to a project and it does not satisfy a soft constraint, then the ranking value can decrease in response to a subjective constrain criterion. In some embodiments, a valuation function can weight the successful and on-time completion of projects with high criticality values more than the successful and on-time completion of projects with lower criticality values.

Determining whether to simulate another project portfolio allocation scenario (138) can be based on, for example, whether a predetermined number of project portfolio allocation scenarios was previously simulated. In some embodiments, another simulation does not occur if a previously determined ranking value meets a predetermined threshold. One or more project portfolio allocation scenarios can be selected based on a ranking value (139) (e.g., all portfolio allocation scenarios with a ranking value above a predetermined threshold can be provided to the user for review). The selected scenarios represent optimized project portfolio allocation solutions because, by only passing through for review those project portfolio allocation scenarios that surpass a threshold, the project portfolio management system advantageously provides the user with an optimum set of scenarios to review.

Figure 1C:
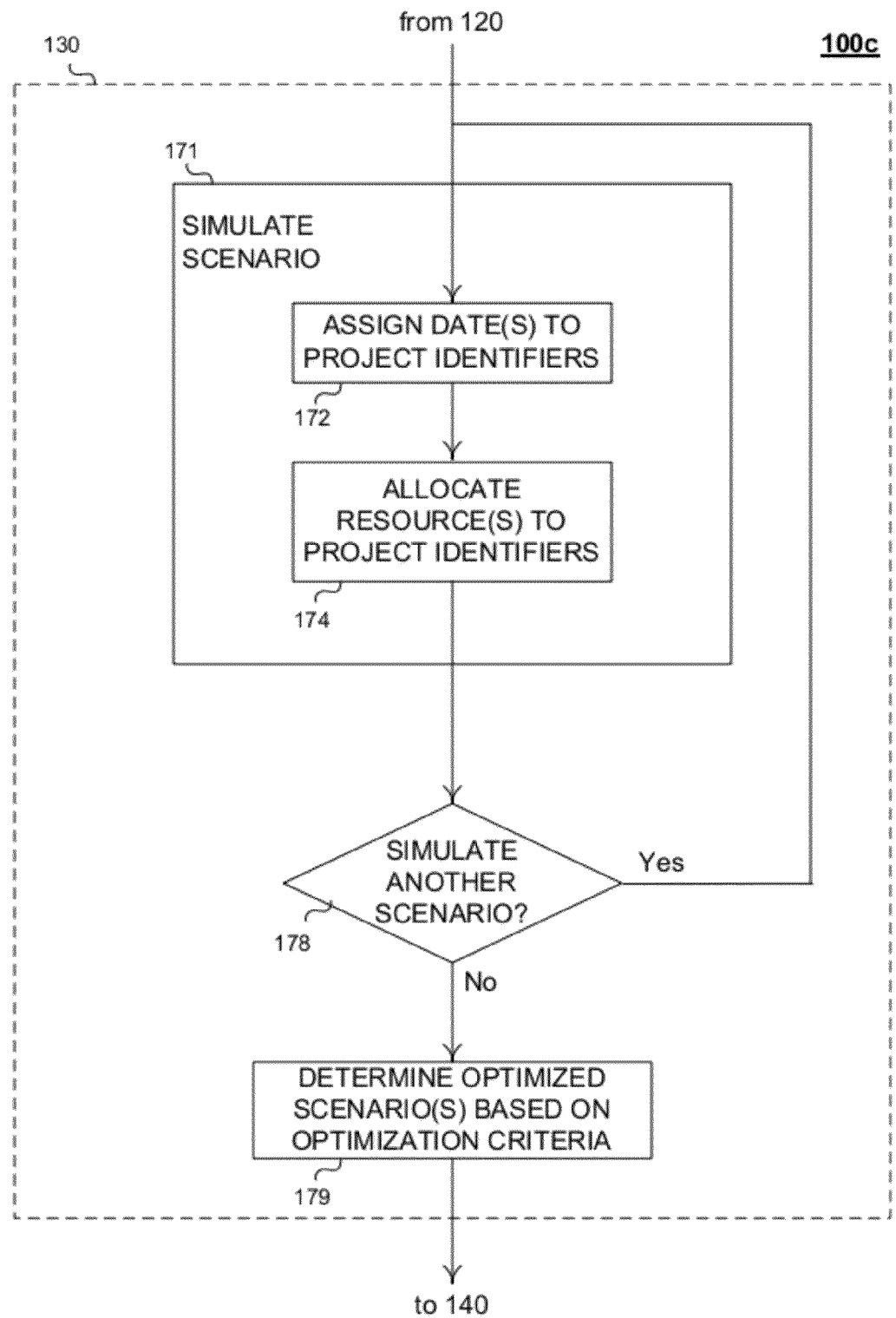

FIG. 1C illustrates a flowchart 100c depicting a general process flow associated with generating optimized project portfolio allocation scenario(s) (130) according to some embodiments. The elements of flowchart 100c can be implemented, for example, by the optimization engine 260 of FIG. 2. Generating optimized project portfolio allocation scenario(s) (130) includes, in part, simulating a single project portfolio allocation scenario (171) and can further include determining whether to simulate another project portfolio allocation scenario (178), followed by generating one or more optimized project portfolio allocation scenarios from the just simulated portfolio allocation scenario(s) to satisfy optimization criteria (179). Simulating a single project portfolio allocation scenario (171) can include assigning one or more date values to project identifiers (172) and/or allocating resources to one or more project identifiers (174). FIG. 1C illustrates that assignment of date(s) to project identifiers (172) occurs before allocation of resource(s) to project identifiers (174), but other process flows can be used. For example, allocation of resource(s) to project identifiers (174) can occur before or concurrently with assignment of date(s) to project identifiers (172).

Techniques for the assignment of date value(s) to project identifiers (132) described above with reference to FIG. 1B can be used to assign date value(s) to project identifiers (172) in the approach of FIG. 1C. Similarly, techniques for the allocation of resource(s) to project identifiers (134) described above with reference to FIG. 1B can be used to allocate resource(s) to project identifiers (174) in the approach of FIG. 1C. Determining whether to simulate another project portfolio allocation scenario (178) can be based on, for example, whether a predetermined number of project portfolio allocation scenarios have been previously simulated. In certain embodiments, all possible permutations of allowable scenarios that satisfy the project-level constraints are simulated.

After one or more project portfolio allocation scenarios that satisfy the project-level constraints are simulated (178), at least one optimized project portfolio allocation scenario can be determined from the simulated scenarios by optimizing an objective function while satisfying one or more portfolio-level constraints (179). The objective function and/or the portfolio-level constraints are defined to realize the objectives of one or more optimization criteria with respect to a portfolio of projects. These criteria generally govern the allocation of resources and/or scheduling of projects within the portfolio.

In general, an objective function determines how close a solution is to satisfy one or more optimization criteria, and constraints associated with the objective function define the domain within which the solution resides. When solving an optimization problem, the objective function is optimized (i.e., maximized or minimized) while subject to the constraints. Therefore, by appropriately defining the objective function and the constraints, optimized solutions can be found that satisfy the objectives of the optimization criteria.

In some embodiments, constraint programming and/or constraint logic programming is used to solve optimization problems.

In the approach illustrated in FIG. 1C, an objective function can take as input one or more simulated project portfolio allocation scenarios. In some embodiments, the objective function is the same as the project portfolio valuation function described above with reference to FIG. 1B. An optimized project portfolio allocation scenario is determined from the input project portfolio allocation scenario(s) by optimizing the objective function while satisfying one more portfolio-level constraints. The objective function and/or the portfolio-level constraints can be defined to realize one or more portfolio-level optimization criteria including a utilization criterion (e.g., an optimized project portfolio allocation scenario maximizes utilization of all available resources), a schedule criterion (e.g., an optimized project portfolio allocation scenario takes the least amount of time to complete projects without overshooting available resources), a risk level criterion (e.g., an optimized project portfolio allocation scenario assumes the least amount of cumulative risk for a given time period), a project criticality criterion (e.g., an optimized project portfolio allocation scenario executes critical projects soonest), a total project portfolio cost criterion (e.g., an optimized project portfolio allocation scenario requires the least amount of cost aggregated over all projects within the portfolio), a return-on-investment (ROI) criterion (e.g., an optimized project portfolio allocation scenario generates the most expected gain from all projects minus cost of all projects), an inter-project dependency criterion (e.g. an optimized project portfolio allocation scenario schedules projects based on their dependency on one another), or any combination thereof.

An exemplary objective function for generating one or more sequences of projects in a portfolio to maximize resource utilization is provided below:

$$\max\left\{\sum_{k=1}^{n}\sum_{m=1}^{H_k} U[r_{k,m}]F[p_k]\right\}, \qquad \text{(Equation 2)}$$

where n represents the number of projects in the portfolio, $H_k$ represents the number of resources available for allocation to the portfolio of projects, $p_k$ represents the $k^{th}$ project in the portfolio of projects, $r_{k,m}$ represents resource m from project k, function U represents a resource utilization function, and function F represents a successful-and-on-time completion function. In this case, project-level constraints can include a portfolio start date, a portfolio finish date, a deferrable criticality level for a project, and a minimum and/or a maximum level of resource utilization for the portfolio.

An exemplary objective function for generating one or more sequences of projects to maximize portfolio ROI is provided below:

$$\max\left\{\sum_{k=1}^{n} R[p_k]F[p_k]\right\}, \qquad \text{(Equation 3)}$$

where n represents the number of projects in the portfolio, $p_k$ represents the $k^{th}$ project in the portfolio of projects, function R represents a project ROI function, and function F represents a successful-and-on-time completion function.

An exemplary objective function for generating one or more sequences of projects in a project portfolio to maximize portfolio criticality is provided below:

$$\max\left\{\sum_{k=1}^{n} C[p_k]F[p_k]\right\}, \quad \text{(Equation 4)}$$

where n represents the number of projects in the portfolio, $p_k$ represents the $k^{th}$ project in the portfolio of projects, function C represents a project criticality level function, and function F represents a successful-and-on-time completion function.

In some embodiments, an optimization criterion is a skill criterion as shown Table 1, in which case the objective function and the portfolio-level constraints are defined to optimally match skills for open positions to available supply. In some embodiments, an optimization criterion is a business outcome criterion for projects that have yet to commence, as shown in Table II. In some embodiments, an optimization criterion is a business outcome criterion for projects that are in flight, as shown in Table III. In some embodiments, a combination of optimization criteria can be used. Each criterion can be scaled by a weight assigned to the criterion. For example, optimization can be performed to maximize portfolio criticality, portfolio ROI and resource utilization based on the objective functions provided in Equations 2-4.

In some embodiments, determining optimized project portfolio allocation scenarios includes selecting and revising one or more of the simulated project portfolio allocation scenarios to optimize an objective function and satisfy one or more portfolio-level constraints. Therefore, an optimized project portfolio allocation scenario may be different from any one of the simulated project portfolio allocation scenarios that satisfy the project-level constraints. In some embodiments, a sequence/scheduling of projects in an optimized allocation scenario is changed in comparison to the sequence/scheduling of the projects in the simulated project portfolio allocation scenarios. In some embodiments, allocation of resources in an optimized allocation scenario is changed in comparison to the allocation schemes presented in the simulated project portfolio allocation scenarios. In some embodiments, a plurality of optimized project portfolio allocation scenarios are generated and ranked according to how well they optimize the objective function while satisfying the portfolio-level constraints.

This hierarchical approach to project portfolio management, as illustrated in FIG. 1C, is advantage because optimization is performed at both the project level (i.e., simulating project portfolio allocation scenarios that satisfy the project-level constraints) and the portfolio level (i.e., generating optimized project portfolio allocation scenarios that satisfy the optimization criteria associated with the portfolio of projects). Consequently, by only passing through for review the optimized project portfolio allocation scenarios, the project portfolio management system advantageously provides the user with an optimum set of scenarios to review.

In some embodiments, a general process flow for generating optimized project portfolio allocation scenario(s) (130) is provided. The process generates at least one optimized project portfolio allocation scenario based on the resource information and the project definitions received (110). The resource information can represent all resources that are available for allocation to one or more of the projects in the project portfolio. Each resource can be correlated to a time period to indicate the availability of the resource over the time period. Each project definition can include one or more project-level constraints, such as a resource constraint that defines what resources are required or can be used for the successful completion of a project. Each resource constraint can be correlated to a time period to indicate the resource requirement over the time period. Based on the resource information and the project definitions, at least one schedule of the projects in the project portfolio is generated such that the resources required by the projects scheduled do not exceed the availability of the resources at any given point in time.

In some embodiments, resources available for allocation may not be sufficient to satisfy all project resource demands. In such a situation, the allocation system can defer some projects by not including them in the project portfolio allocation scenario(s) generated. Project deferral can be based on the criticality and/or priority of the projects (e.g., projects that are least critical are most likely to be deferred).

In some embodiments, the allocation condition can be imposed as a project-level constraint, optionally along with other project-level constraints, for allocating resources to projects. The allocation condition can be integrated in the process flow (134) illustrated in FIG. 1B or in the process flow (174) of FIG. 1C.

In some embodiments, the allocation condition can be expressed as a portfolio-level optimization criterion, along with other portfolio-level optimization criteria, that are implemented in the process flow (179) of FIG. 1C.

In some embodiments, the allocation system can provide a list of the gaps in resources to a user, highlighting those resource demands within a project portfolio that cannot be satisfied due to resource unavailability. Based on the list, the allocation system can generate one or more action plans to remedy the resource gaps. For example, plans to perform additional hiring, outsourcing, or training can be implemented.

Figure 1D:
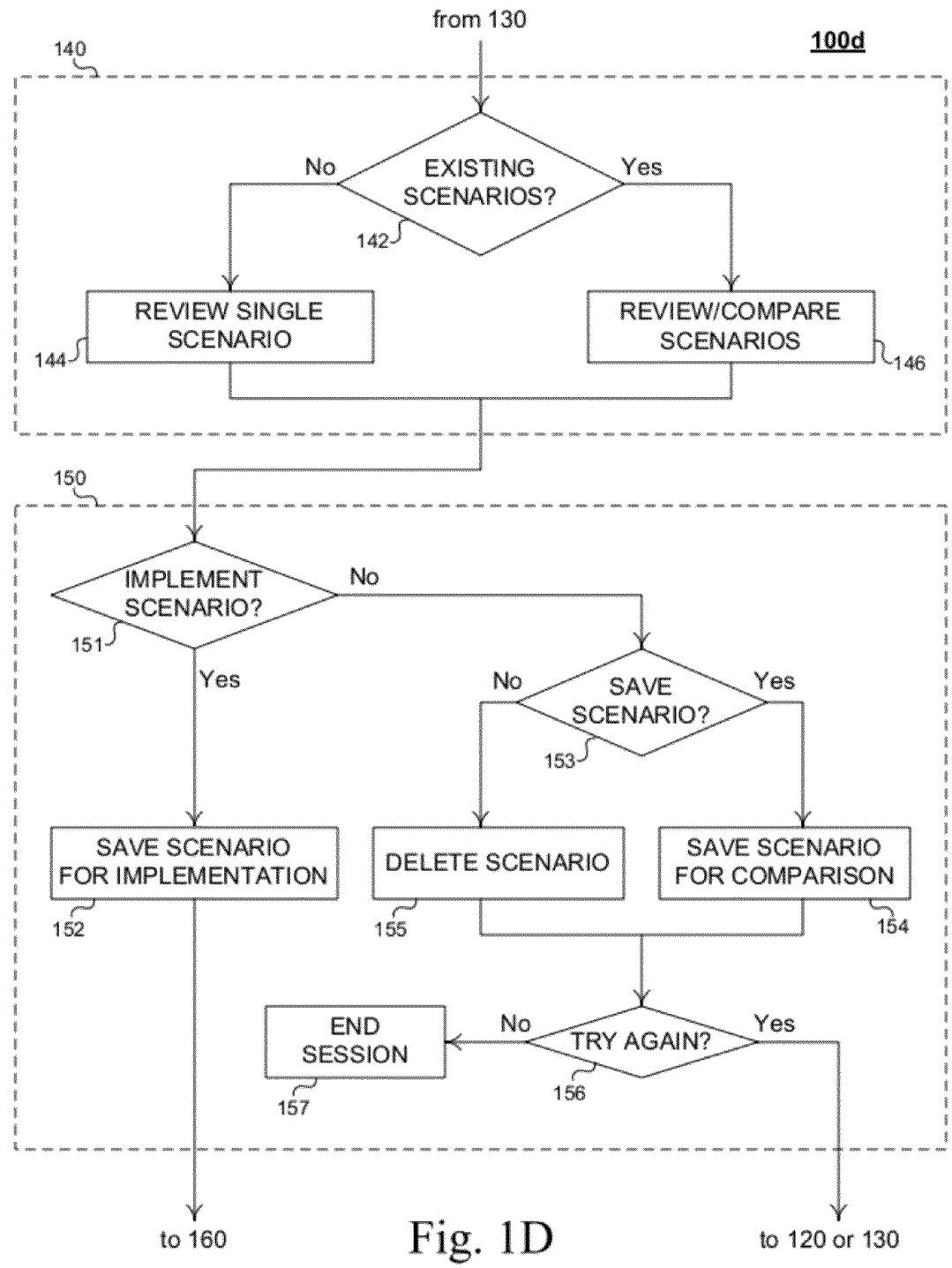

FIG. 1D illustrates a flowchart 100d depicting general process flows associated with reviewing project portfolio allocation scenario(s) (140) and user selection of project portfolio allocation scenario(s) (150) according to some embodiments. Reviewing project portfolio allocation scenario(s) (140) can include determining whether there are any existing project portfolio allocation scenarios (142) (e.g., either a baseline scenario or previously simulated scenarios), and reviewing a single project portfolio allocation scenario if there are no existing scenarios (144) or reviewing/comparing two or more project portfolio allocation scenarios if there were previously saved scenarios (146). Comparing two project portfolio allocations scenarios advantageously allows a manager to compare between two scenarios to determine either what is different between them or to help formulate feedback in possibly trying a new simulation with different optimization parameters and/or resource allocations.

User selection of at least one project portfolio allocation scenario (150) can include determining whether to implement a particular project portfolio allocation scenario (151). If the scenario is selected for implementation, then the scenario is saved for implementation (152) and an action plan can subsequently be generated (160). If a user chooses not to implement a project portfolio allocation scenario, then the user determines (153) whether to delete the project portfolio allocation scenario (156) or save the project portfolio allocation scenario for later comparison and/or implementation (154). The user can determine (156) whether to end the session (157) or to reiterate the process to try further scenario simulations (130) and/or modify the input parameters (120) simulations of different.

Generating an action plan (160) for a selected project portfolio allocation scenario can include generating instructions to resource and/or project managers for affecting an actual change of resource allocation(s) and/or assignment of project date(s). An action plan can include a set of data highlighting changes necessary to move from the current state of allocation of resources in the project portfolio allocation to the desired project portfolio allocation scenario. For example, an action plan can include acquisition of addition resources to meet an anticipated need, such as hiring more human personnel and/or purchasing more physical resource. An action plan can also provide provisions for training existing human personnel or upgrading existing physical resources.

Figure 2:
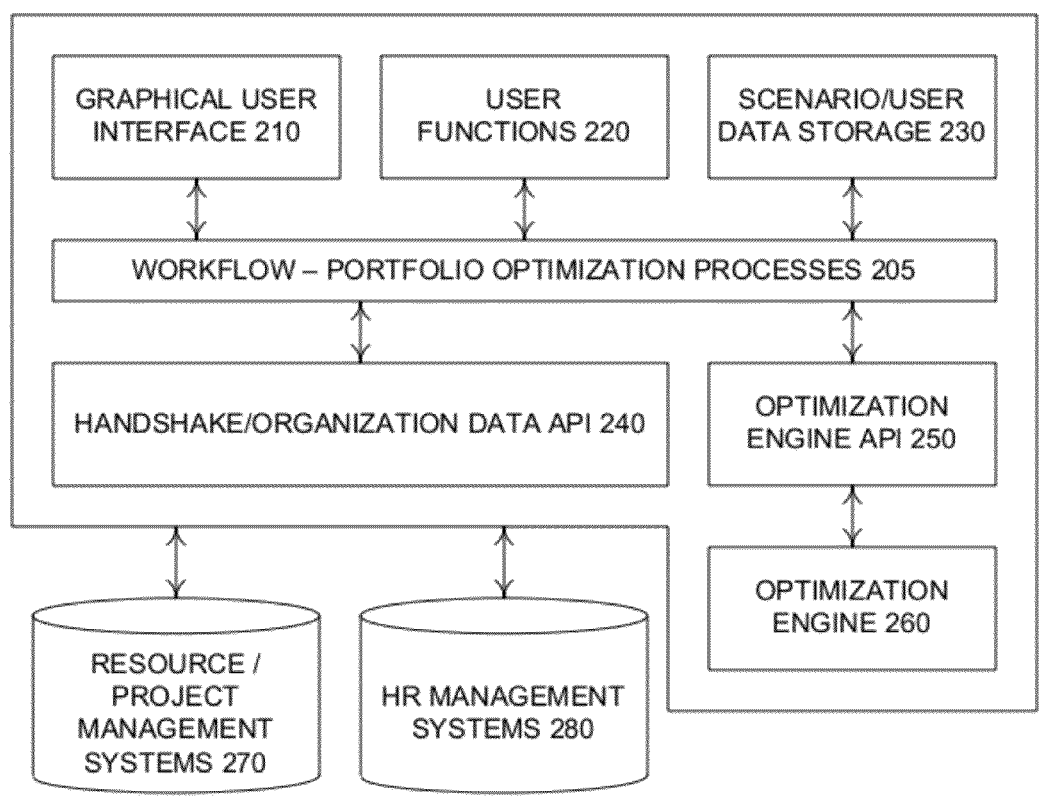
FIG. 2 is a block diagram showing a design of a project portfolio management system.

FIG. 2 is a block diagram showing a design of a project portfolio management system 200 according to some embodiments. The resource allocation system 200 includes a combination of processes and software modules. The workflow of the portfolio optimization processes 205 can be described using the exemplary flowcharts 100a-d of FIGS. 1A-1D. Software modules can include a graphical user interface (GUI) module 210, a user functions module 220, a scenario and user data storage module 230, a handshake/organization data application interface (API) module 240, an optimization engine API module 250, and/or an optimization engine module 260. In some embodiments, resource allocation system 200 can also be implemented as a Software as a Service (SaaS) (e.g., deployed to run over the Internet and/or a private local or wide area network).

GUI module 210 can handle user access (e.g., login and/or logout), user administration (e.g., any of the administration functions associated with the support and/or management of the system 200), widget management (e.g., providing the end user with the capability to arrange and save preferences for display of data within the browser area), and/or other GUI services.

User function module 220 can provide functions to the user in their use of the project portfolio management system 200. For example, user function module 220 can include a project portfolio allocation scenario comparison engine (e.g., to allow the user to compare different scenarios in step (146)), an organization browser, a project schedule manager module (e.g., to allow the user to modify in any way the schedule of a project in a portfolio), an optimization parameter control module (e.g., during step (120) to provide the user with an interface to modify in any way the portfolio valuation function for the approach illustrated in FIG. 1B or the objective function for the approach illustrated in FIG. 1C in order to provide flexibility in ways to optimize the portfolio), a resource management module (e.g., during steps (110) or (120) to allow the user access to view/define resource information, such as skills/roles/locations/costs, and/or to manually assign resources to one or more projects), a deferred projects module (e.g., to manage and/or alert the user about projects that have been deferred), an import/export module (e.g., to load previously saved scenarios or to save scenarios to a storage device), and/or other modules that specify user functions.

In some embodiments, the project schedule manager can allow the user direct interaction with multiple project schedules and resourcing. The project schedule manager can also display outcome(s) and/or change(s) associated with an optimization calculation, highlight projects based on selected criteria (e.g. low/medium/high risk), allow a user to view project resource information in greater detail, and/or highlight dependencies that impact rescheduling. The scenario comparison engine can allow comparison(s) of key information across each scenario to inform decision making for the user. The organization browser can allow the user to select a level in organization for optimization activity, can integrate with an HR system for organization detailed information, and/or can cross references organization data with project and/or resource data to form appropriate views. The optimization parameter control module can allow the user to select optimization parameter(s) for each scenario, view parameter(s) selected by currently active scenarios, and/or set/view color coding associated with variations in parameter levels. The project portfolio resource management module can provide collated view(s) of all projects, drill down capability by categorization, dynamical updates based on optimization changes, and/or resource thresholds that can be set graphically to highlight over/under runs versus levelled plans. The deferred projects module can provide a memory storage management for cancelled projects (either manually or via optimization), and can allow for assessment of savings associated with portfolio restructuring. The import/export module can provide capability for import and export of a variety of information form the system (e.g., scenario information, comparison data, parameters, and/or deferred project data).

Scenario and user storage module 230 can provide processing functions for a data model that can be used as part of the creation, optimization and/or management of project portfolio allocation scenarios. For example, as part of the initial input of resource/project information (110) and/or optimization criteria/allocation information (120) from a project portfolio management system, module 230 can store a baseline set of data within a base schema. The base schema can reflect both the working data model as well as an interface API schema mapping. Scenario and user storage module 230 can also provide functionality to save/load project portfolio allocation scenarios. For example, when project portfolio scenarios are received back from the optimization engine module (e.g., before step 138, or at steps 152, and/or 154), the user, and/or a constraint driver. Workflow status (e.g., draft, submitted, in-planning, executed, complete, etc.) can also be stored in a data model.

Organization data API module 240 can provide integration with workflows from other resource/project management systems 270 and/or HR management systems 280. In some embodiments, the design for an interface with resource and project management systems can use the following type of model APIs through web services. Each web service can include a base class with several to many methods plus related data set classes. The system can include three general kinds of APIs: generic APIs (e.g., APIs that expose the resource/project management systems 270), project-specific APIs (e.g., APIs that are specific to performance and target Project Web Access features), and project-specific APIs (e.g., APIs available through the Shared Service Provider URL, but only have public methods documented).

Optimization engine API module 250 can provide a two way API with state awareness held either at the side of optimization engine module 260 or at the side of the workflow engine 205. Optimization engine API module 250 can forward any information regarding a project portfolio scenario (e.g., resource information, project definitions, current allocations, etc.), and any input information established (120) by the user. Initially, a baseline project portfolio allocation scenario data set can be sent to optimization engine 260 with initial constraints parameters. After optimization engine 260 has performed a simulation, it can provide feedback to the workflow 205 including updated information on the simulated project portfolio allocation scenario.

Optimization engine module 260 can perform two functions: generate optimized project portfolio allocation scenario(s) (130) and/or provide output detailing any change (160) associated with an input project portfolio allocation scenario after processing.

USE CASE EXAMPLES

FIGS. 4-8 illustrate graphical user interfaces depicting use case examples for using a project portfolio system to simulate and optimize project allocation scenarios. FIGS. 4-8 are not necessarily to scale; emphasis is instead generally being placed upon illustrating the principles of the invention. The project portfolio system illustrated by the graphical user interfaces of FIGS. 4-8 can be based on, for example, graphical user interface 210 of the exemplary project portfolio resource allocation system 200 of FIG. 2, which can, in turn, use the process flows illustrated in FIGS. 1A-1D.

Figure 4A:
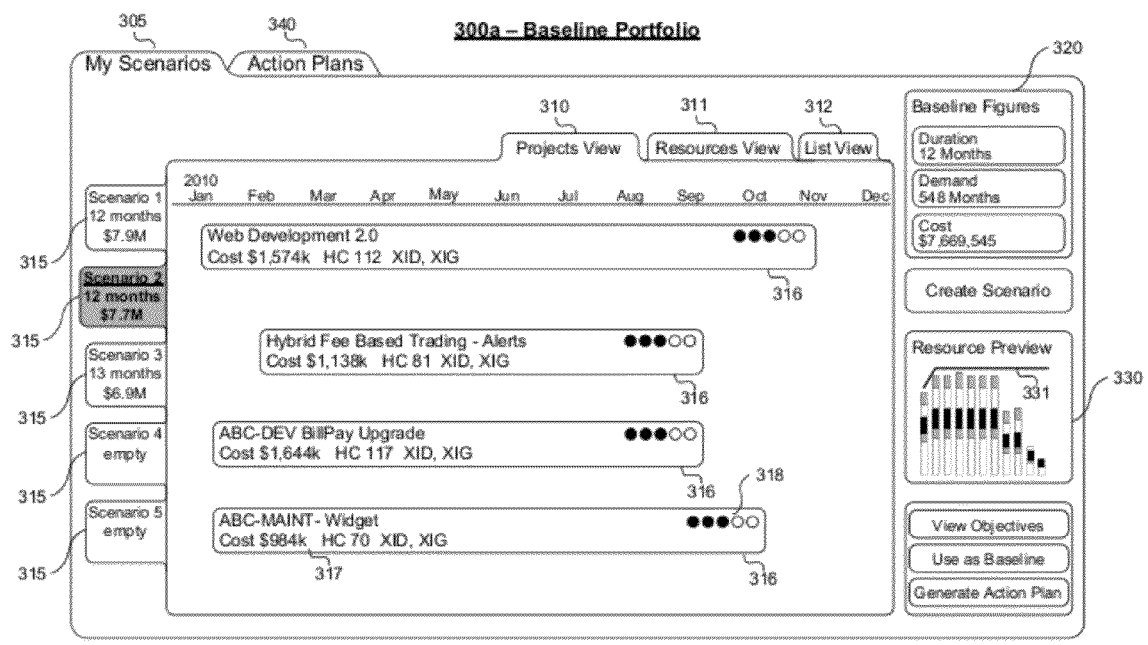
FIGS. 4-8 illustrate graphical user interfaces depicting use case examples for using a project portfolio system to simulate and optimize project allocation scenarios.

In the following use case examples, as FIG. 4A shows, each graphical user interface includes a scenario window 305 associated with reviewing, modifying, and/or simulating project allocation scenarios. Scenario window 305 includes a projects view 310, a resources view 311, and a list view 312, each capable of being selected using tabs. Within each view 310-312, more than one project allocation scenario can be loaded and selected using tabs 315. For example, a user can load one or more project allocation scenarios each associated with the same project portfolio (e.g., they want to try different variations of one or more of the following use case examples for one of their portfolios) and/or can load one or more project allocation scenarios associated with different project portfolios. A project view 310 can include one or more graphical representation 316 for a project. Each project representation 316, in turn, can include textual information 317, criticality information 318, and/or other graphical/textual information. Textual information 317 can include, for example, the name of the project, the cost of the project (per unit time or total cost), the required resources, the required skills of the resource, and/or other textual/graphical information.

Scenario window 305 also includes baseline figure information 320 and resource preview information 330. Baseline figure information 320 is associated with the currently selected project portfolio allocation in the project view 310. Resource preview information 330 can include a representation (e.g., a bar graph representation or other graph representation) of the currently allocated resources with respect to condition 331 (e.g., maximum capacity of available resources or a predetermined percentage thereof). Different types of resources (e.g., based on skill set, location, etc.) can be represented graphically using different colors and/or shadings.

Use Case 1: Addition of New Project to Existing Portfolio

Figure 4B:
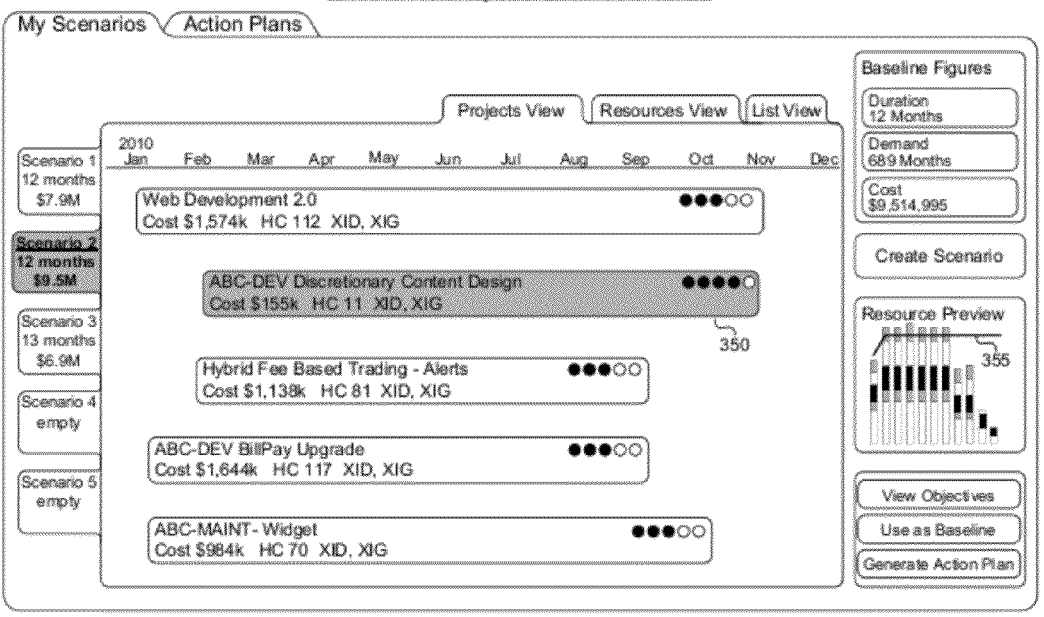
Figure 4C:
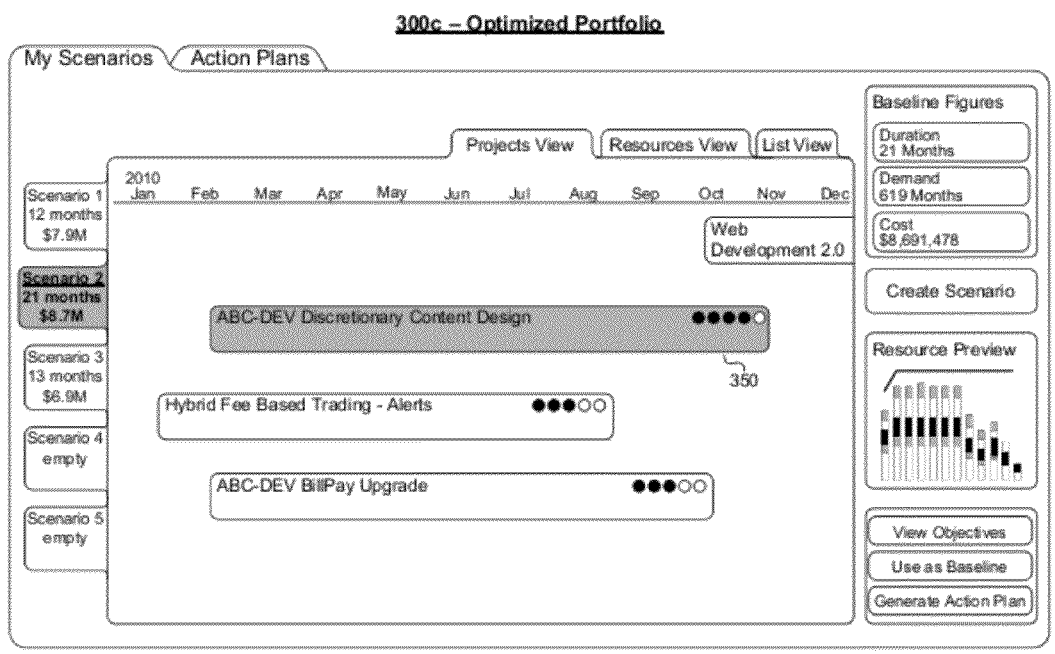

FIGS. 4A-4C illustrate graphical user interfaces 300a-c, respectively, depicting the optimization of an existing project portfolio when a new project is added. For example, a project portfolio manager can be informed that a new project by the ABC-DEV group for Discretionary Content Design is required and asked how the appropriate resources can be made available to meet this new demand.

FIG. 4A illustrates graphical user interface 300a depicting the current state of the project portfolio, which includes four projects (i.e., the Web Development 2.0 project, the Hybrid Fee Based Trading Alerts project, the ABC-DEV BiliPay Upgrade project, and the ABC-MAINT Widget project). In the current state, these four projects have sufficient resources allocated and approved throughout their projected duration. The resources include resources of varying criticality, varying technical skill and business domain knowledge. Three projects have already started in January, and one project has a planned start date of middle February based on, for example, customer time constraints, regulatory time constraints or business case driven time constraints. Other projects are more flexible and have been planned based on available resources (e.g., based on appropriate skills and business domain knowledge match, approved business cases, and/or related release plans).

FIG. 4B illustrates graphical user interface 300b depicting the addition of project 350—the ABC-DEV Discretionary Content Design project—that is defined to have cost information, resource demand information, a 4 out of 5 criticality rating, and an end date of November 2010, to meet the need of a key customer. However, the addition of project 350 requires resources that surpass the available resources 355. To meet the customer's need, project 350 can be defined to include a must-end-by-date constraint. The projects that are currently in-flight can be set with a status of "scheduled," which can apply a constraint with the effect that the project cannot be moved out, deferred or cancelled. Alternatively, one or more of the in-flight projects can be defined to include a constraint that allows them to be subject to rescheduling.

FIG. 4C illustrates graphical user interface 300c depicting the output of the optimization engine 260 that provides project portfolios optimized based on the objective of project criticality (e.g., the valuation functions of the approach illustrated in FIG. 1B or the objective function and the portfolio-level constraints of the approach illustrated in FIG. 1C provide greater weight to completing projects with a higher criticality rating than others). In some embodiments, simulation of the different project allocation scenarios can also include scheduling (132) and/or allocating resources (134) first to projects with the highest criticality level before less critical projects. In yet further embodiments, projects with a criticality level below a predetermined threshold can be deferred when insufficient resources exist to satisfy all of the total demand captured in the scenario currently being processed.

The optimized project portfolio scenario illustrated in graphical user interface 300c illustrates that the Web Development 2.0 project was delayed until October, the Hybrid Fee Based Trading Alerts project was moved up by one month, the ABC-DEV BillPay Upgrade project was delayed by one month, and the ABC-MAINT-Widget project was canceled in order to free up resources for the new project 350. If the project portfolio manager so chooses, the simulated project portfolio allocation scenario can be selected (150) and an action plan can be generated (160) to detail the changes required to move from the current state of the project portfolio to the new project portfolio (e.g., comparing one scenario with another).

Use Case 2: Change in Project Resource Demand

Figure 5A:
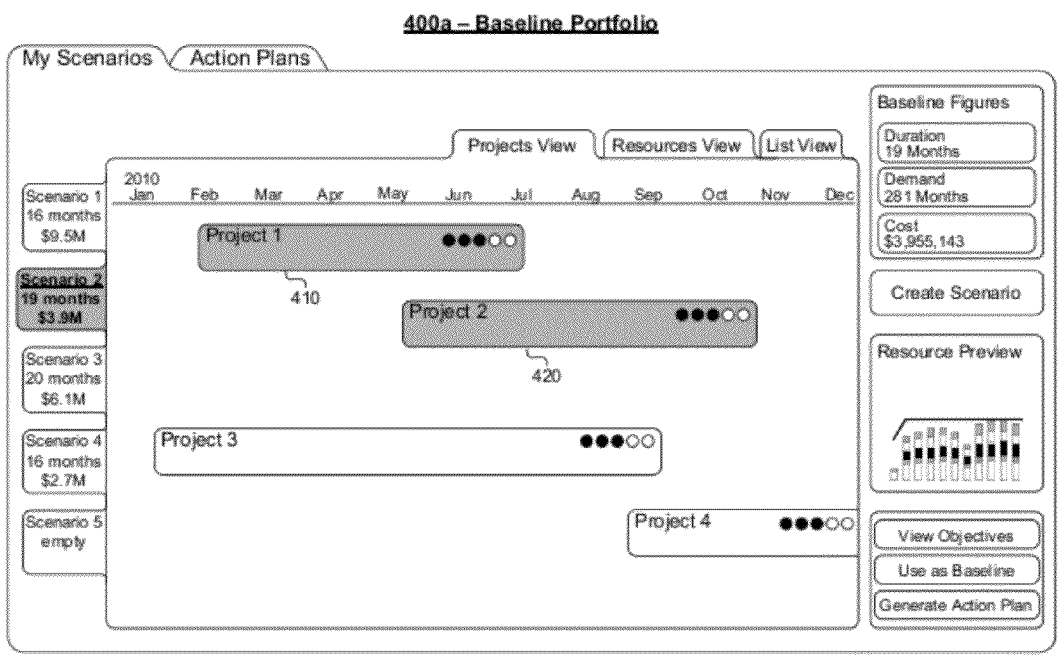
Figure 5B:
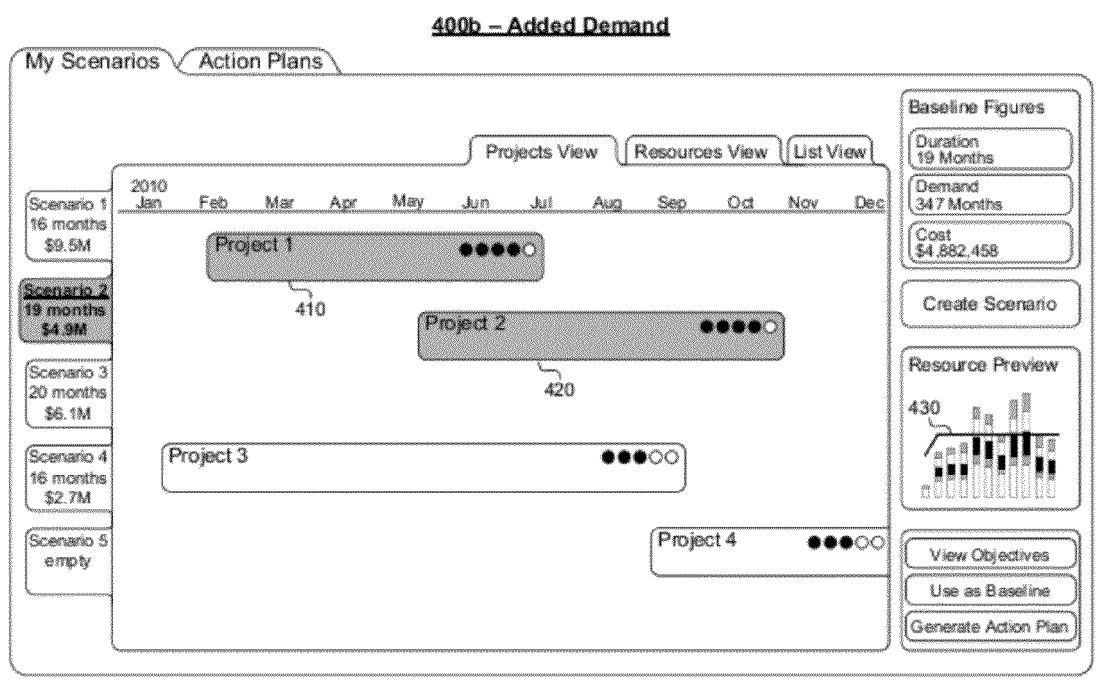
Figure 5C:
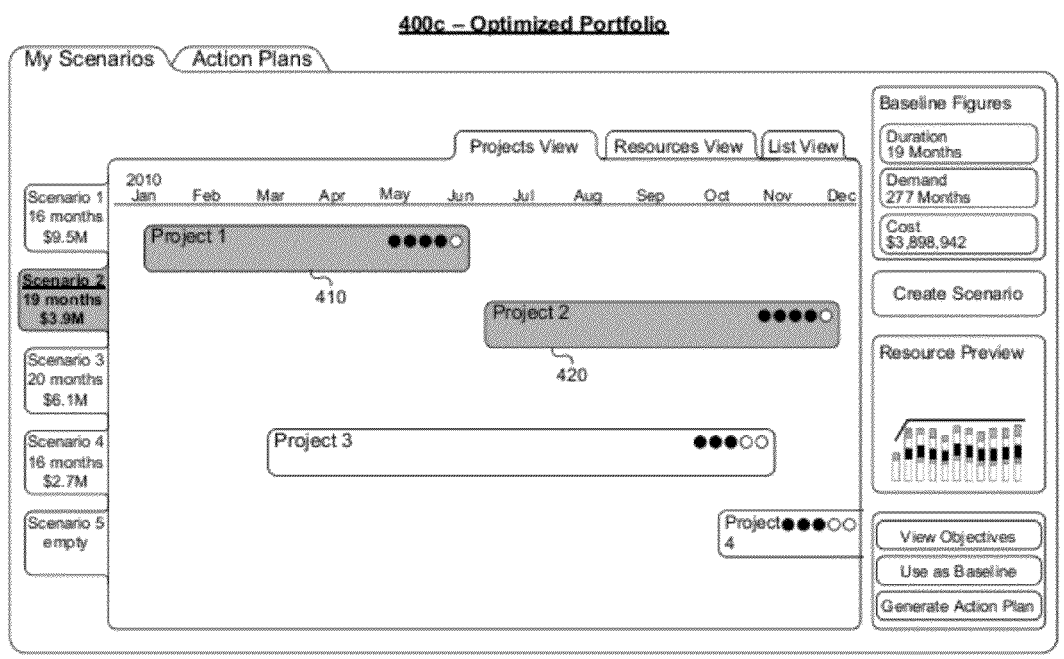

FIGS. 5A-5C illustrate graphical user interfaces 400a-c, respectively, depicting the optimization of a project portfolio when the resource demands of projects are modified. For example, a project portfolio manager can be faced with a planning scenario in which two major projects (e.g., projects 410 and 420) are in the planning stage and have been identified as needing additional resources to provide the most effective solution to meet the defined feature requirements. The project portfolio manager is asked to provide a solution that can increase the projected ROI to the business. The additional work to be allocated to projects 410 and 420 requires resources with a specific mix of technical skills and specific business/product domain knowledge that are currently scheduled on other projects, which have a lower return on investment. The project portfolio manager can determine how the appropriate resources can be re-assigned to address the change in requirements and to maximize the return on investment.

FIG. 5A illustrates graphical user interface 400*a* depicting the currently planned allocation of resources in the project portfolio, which includes the two major projects 410 ("Project 1") and 420 ("Project 2") and two other projects ("Project 3" and "Project 4"), all of which have been set with the same level of criticality.

FIG. 5B illustrates graphical user interface 400*b* depicting the addition of resource demand to projects 410 and 420. In addition, the criticality level for projects 410 and 420 has been increased. The resources with the specific mix of technical and business domain skills required are set to critical and assigned to the project. The impact of the increase in resource demand on the portfolio can immediately be seen in the Baseline and Resource Preview information. In particular, the required resources surpass the available resources 430.

FIG. 5C illustrates graphical user interface 400*c* depicting the output of the optimization engine 260 that provides project portfolios optimized based on the objective of ROI. In some embodiments, the optimization can also be based on an objective of project criticality. In some embodiments, optimization of project allocation scenarios can also include scheduling (132) and/or allocating resources (134) first to projects with the highest criticality level before less critical projects. In yet further embodiments, projects with a criticality level below a predetermined threshold can be deferred when insufficient resources exist to satisfy all of the total demand captured in the scenario currently being processed.

The optimized project portfolio scenario illustrated in graphical user interface 400*c* illustrates that the project 1 has been moved up by one month, project 2 has been delayed by one month, and projects 3 and 4 have been delayed by one month. If the project portfolio manager so chooses, the simulated project portfolio allocation scenario can be selected (150) and an action plan can be generated (160) to detail the changes required to move from the current state of the project portfolio to the new project portfolio.

Use Case 3: Change in Project Scheduling Constraint

Figure 6A:
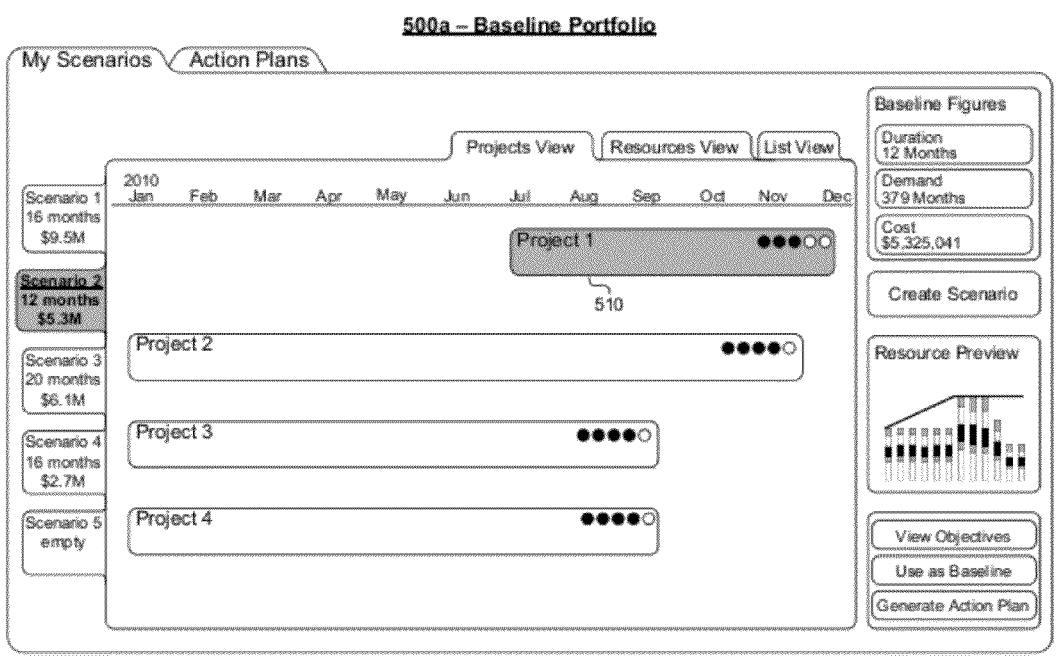
Figure 6B:
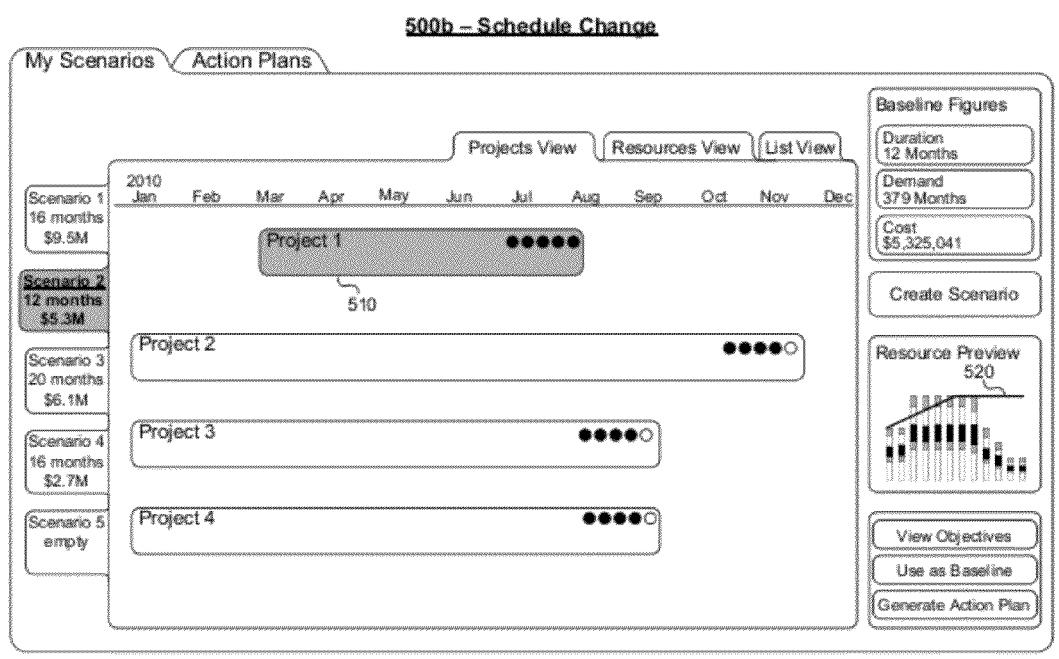
Figure 6C:
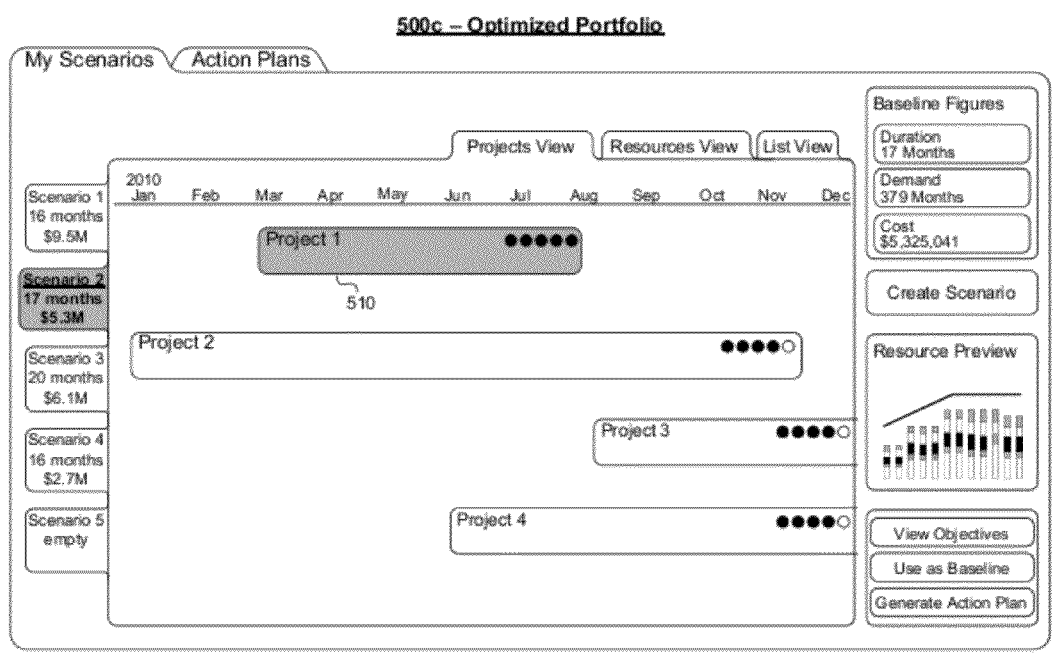

FIGS. 6A-6C illustrate graphical user interfaces 500*a-c*, respectively, depicting the optimization of a project portfolio when the scheduling constraints of projects are modified. For example, a project portfolio manager can be faced with a situation in which the start of a core operational environment software upgrade project has been expedited by 4 months. The project portfolio manager is asked to provide a solution that allows the new deadline to be met while minimizing the impact on the rest of the portfolio.

FIG. 6A illustrates graphical user interface 500*a* depicting the currently planned allocation of resources in the project portfolio, which includes the four projects. Project 1 (510) was initially estimated at 12 people for 6 months. Seven of the twelve people have a unique skill set and experience level critical for this work. All 12 are currently fully committed to other projects. In addition, the 7 with the unique skill sets are working on a similar project during this new requested time frame. However, based on a directive from corporate compliance, the effective go live date for a specific software upgrade initiative has been moved back four months from December 2010 to August 2010. This new delivery date must be met, with no exceptions. Project 510 has a resource constraint requirement for 12 resources over a period of 6 months. Seven of these 12 resource constraints include an additional constraint that requires a unique technical and business domain knowledge skill level mix that is critical to the success of the project. These 7 critical resources are currently assigned to a similar project that falls within the same timeframe as this project. Any rescheduling of projects needs to take into account the maximum number of locations from which a projects can be resourced from. The allocation of resources needs to take into consideration of the maximum number of projects that an individual resource can work on at any one time.

FIG. 6B illustrates graphical user interface 500*b* depicting the change of the "must end by" date constraint for project 510. In addition, project 510 has been given the highest criticality constraint (e.g., a 5 out of a 5-point scale). Furthermore, the 7 resource constraints identified as having the unique skill set required for project 510 are flagged as critical to this project. As can be seen in the resource review information 520, the impact on the portfolio resourcing, schedule and costing is immediately visible. To rebalance this project portfolio, the optimization objective of criticality and optimization constraints setting the fragmentation of locations a project may be resourced from and also the resource fragmentation across projects. This means that the highest criticality projects are scheduled and resourced with the most critical resources first and less critical projects may be deferred where there are insufficient resources to satisfy all of the total demand currently captured in the current scenario. Because a certain level of resource fragmentation is allowed resources may be assigned to concurrent projects but not exceeding the maximum resource utilization specified. Projects may also be resourced from a number of locations, but within the fragmentation limit set.

FIG. 6C illustrates graphical user interface 500*c* depicting the output of the optimization engine 260 that provides project portfolios optimized based on the objective of criticality. In some embodiments, optimization of project allocation scenarios can also include scheduling (132) and/or allocating resources (134) first to projects with the highest criticality level before less critical projects. In yet further embodiments, projects with a criticality level below a predetermined threshold can be deferred when insufficient resources exist to satisfy all of the total demand captured in the scenario currently being processed.

Use Case 4: Addition of New Resources to Existing Portfolio

Figure 7A:
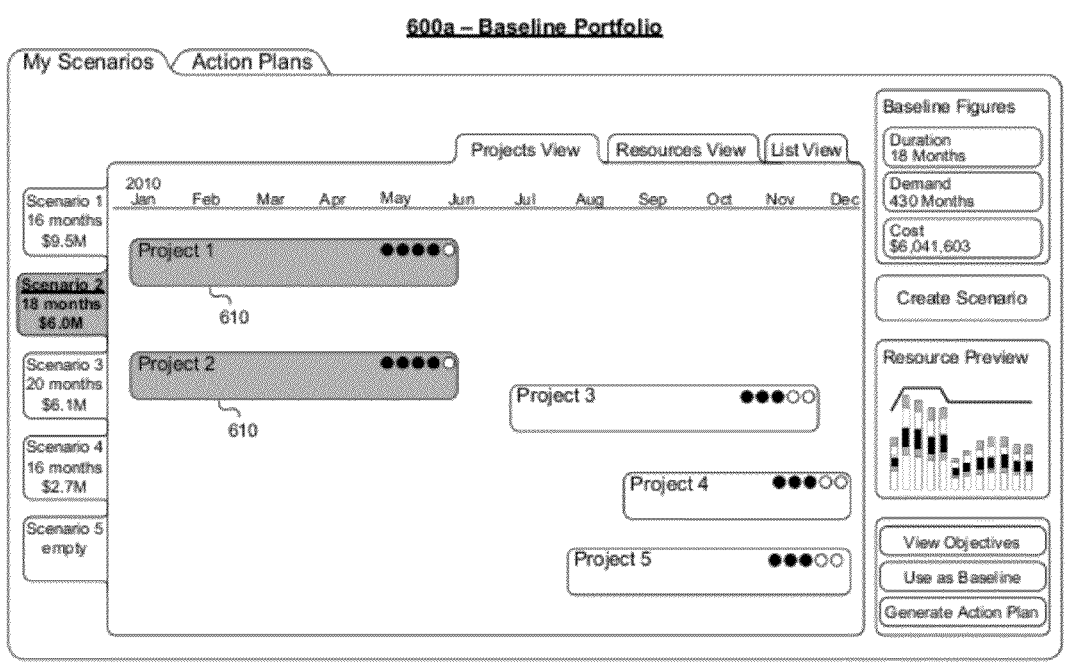
Figure 7B:
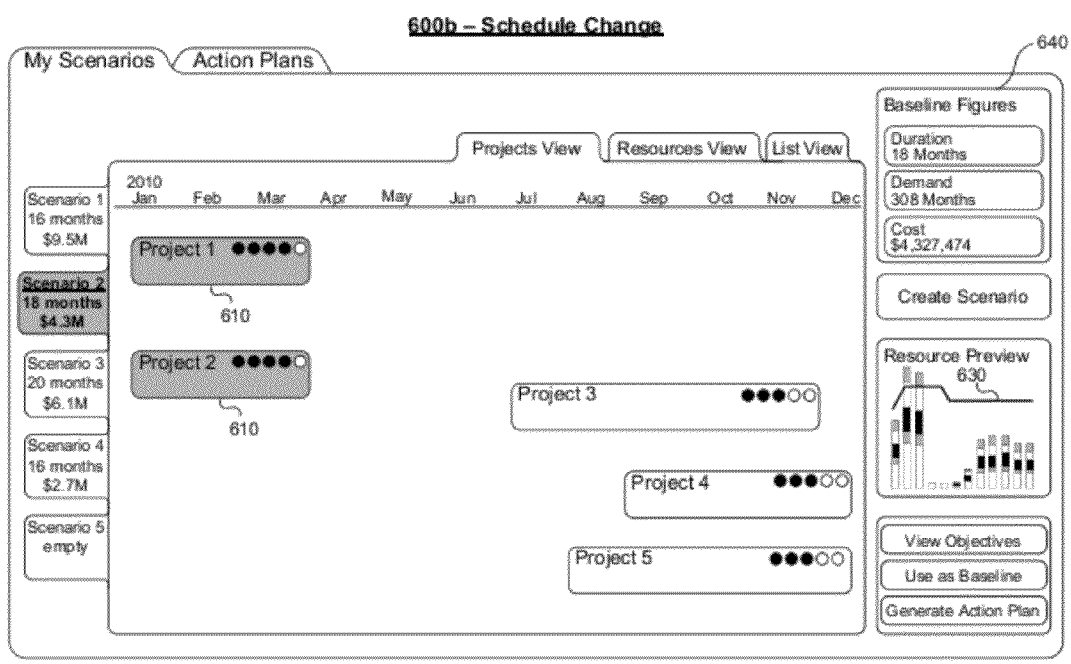
Figure 7C:
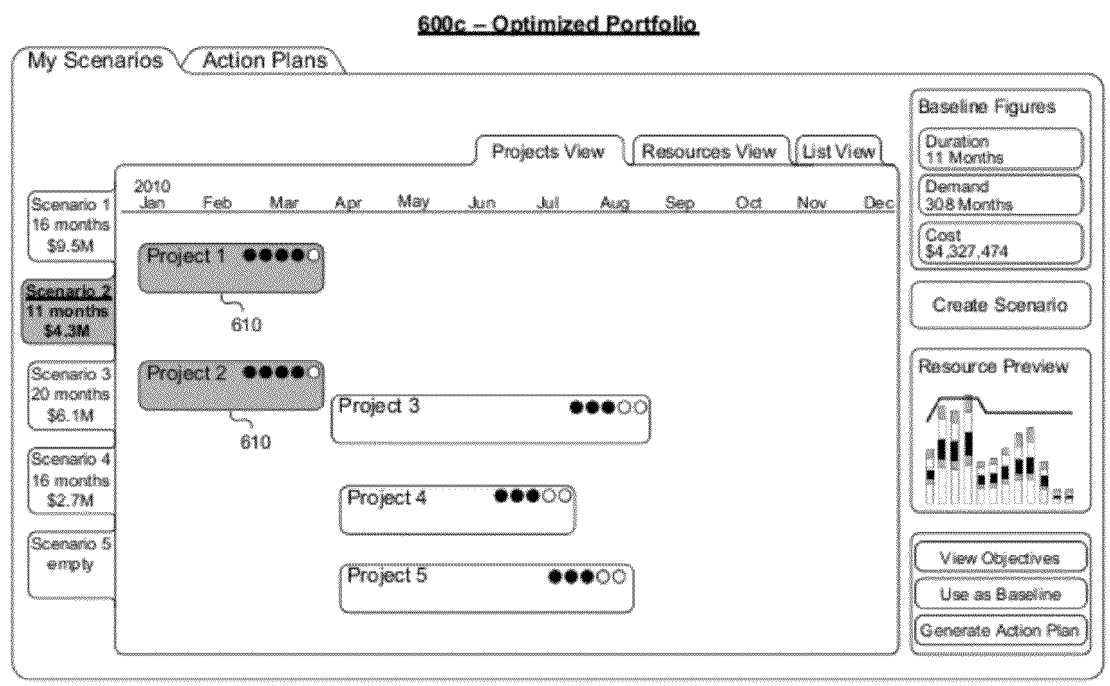

FIGS. 7A-7C illustrate graphical user interfaces 600*a-c*, respectively, depicting the optimization of a project portfolio when the addition of new resources are provided to an existing project portfolio. For example, a project portfolio manager can be faced with a situation in which additional resources can be added now and is asked how the added resources can be allocated to the in-flight projects in order to realize a potential increase in available resource capacity.

FIG. 7A illustrates graphical user interface 600*a* depicting the currently planned allocation of resources in the project portfolio, which includes the five projects. Project 1 (610) and Project 2 (620) can leverage their work on certain tasks to essentially complete all activities three months ahead of schedule if they can add some resources now. The respective project managers, for example, have identified the need for 12 additional QA resources for 2 months from February to March of 2011 to free up all 35 people currently assigned to Project 1 (610) and Project 2 (620) for the final planned three months (May to July 2010).

FIG. 7B illustrates graphical user interface 600*b* depicting the addition of 12 QA resources that were added to Project 1 (610) and Project 2 (620) during the period February to March 2010. The duration of Project 1 (610) and Project 2 (620) is accordingly shortened by 3 months (from July 2010 to April 2010). Project 1 (610) and Project 2 (620) are also set with a higher criticality level and a status of scheduled. The impact on the increase in resource demand over February and March and the decrease in resource demand over May to July on the portfolio resourcing, schedule and costing is visible in the resource review information 630 and baseline information 640. To rebalance this project portfolio, the optimization objective of number of projects and resource utilization is used. This means that critical projects are scheduled with the additional resources as required and that remaining projects are scheduled according to criticality and availability of resources with the appropriate mix of technical and business domain knowledge skill sets.

FIG. 7C illustrates graphical user interface 600*c* depicting, for example, the output of the optimization engine 260 that provides project portfolios optimized based on the objective of criticality and resource utilization. Project 1 (610) and Project 2 (620) are scheduled with the additional resources assigned and ending in April 2010. The remaining portfolio projects are scheduled according to criticality levels and availability of resources with the appropriate mix of technical and business domain knowledge skill sets and observing any customer, regulatory or business defined project-level constraints. As there is now additional available capacity from May to July 2010, the original projects have been scheduled to begin at an earlier date to make use of the available resources. In addition, any deferred projects can also be scheduled where there is a resource skills, knowledge match to utilize this available capacity.

Use Case 5: Rebalance Portfolio to Address Incident Issues

Figure 8A:
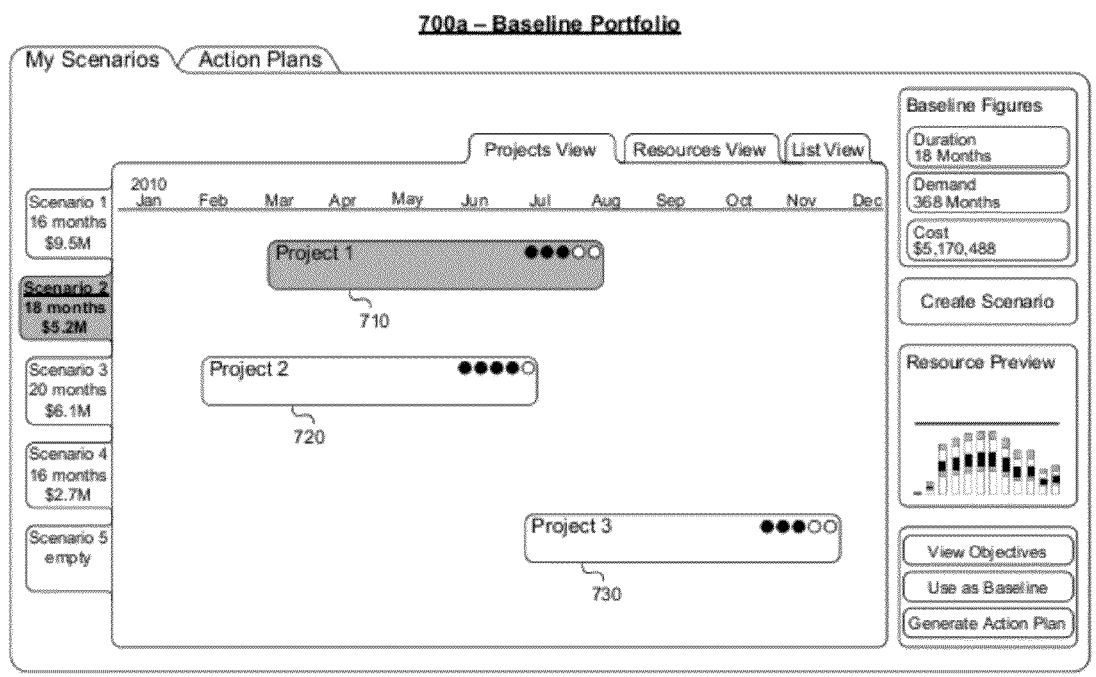
Figure 8B:
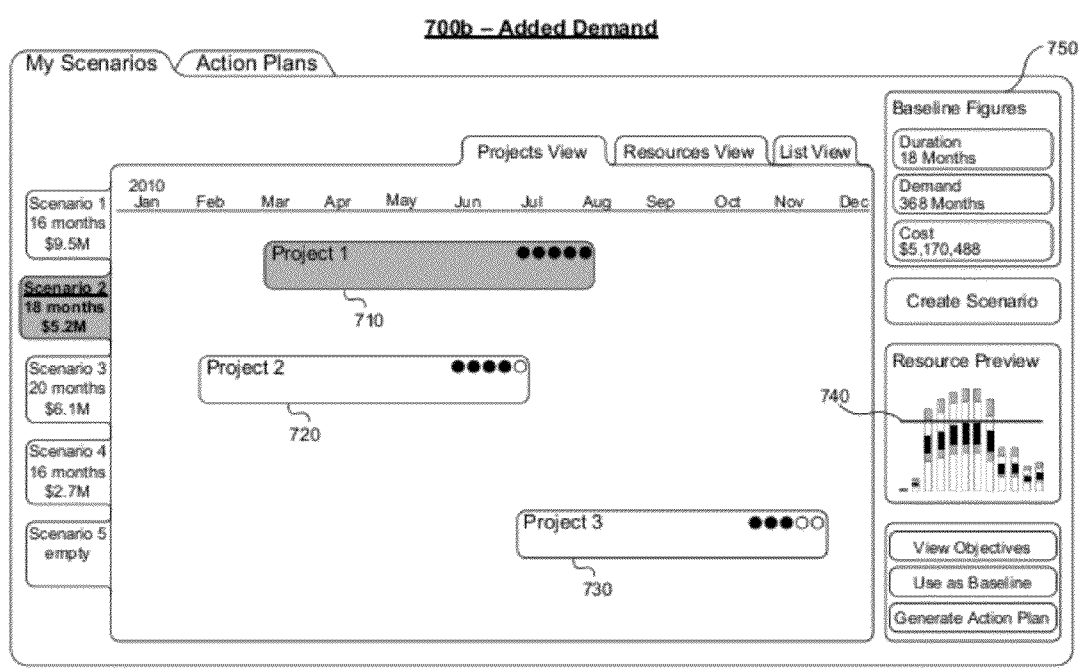
Figure 8C:
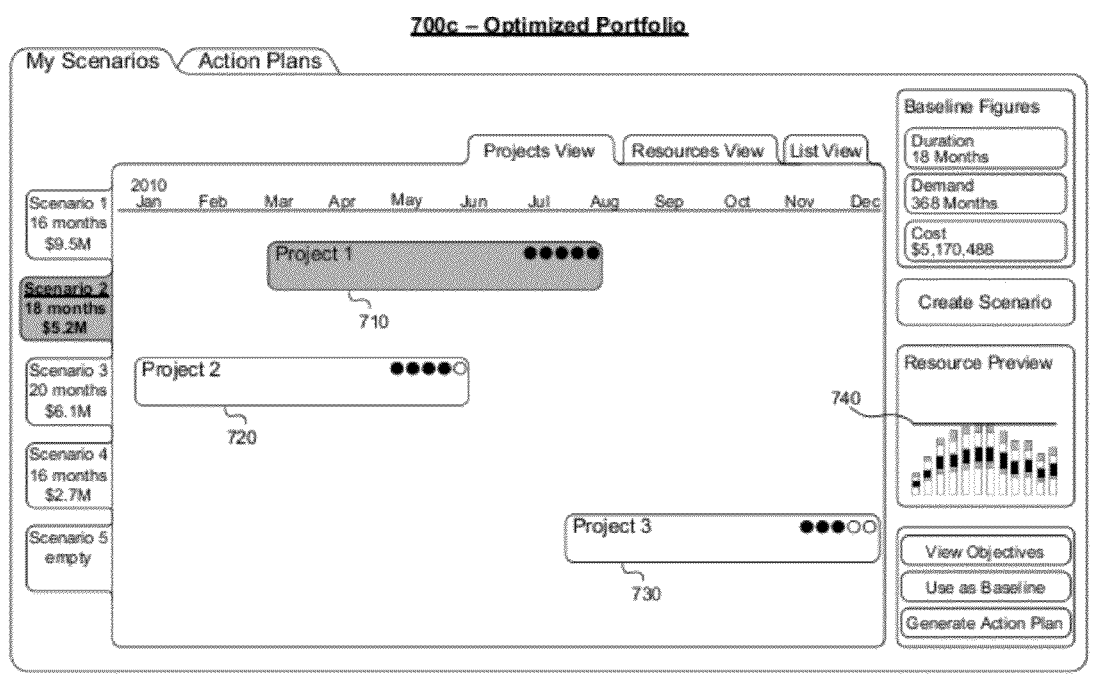

FIGS. 8A-8C illustrate graphical user interfaces 700*a*-*c*, respectively, depicting the optimization of a project portfolio when resources need to be rearranged. For example, a project portfolio manager can be faced with a situation in which incident levels for a particular product have reached a level where resources need to be diverted from other maintenance activities to Project 1 (710) (e.g., a maintenance project associated with the product). In addition, eight development resources need to be shifted to problem management for at least two months to assist in diagnosing the root cause and arranging for corrections. The project portfolio manager is asked how the required resources can be made available to address the incident level issue while minimizing the impact on the remaining portfolio projects.

FIG. 8A illustrates graphical user interface 700*a* depicting the currently planned allocation of resources in the project portfolio, which includes the three projects—Project 1 (710), Project 2 (720), and Project 3 (730). Project 1 (710) can be, for example, "product maintenance."

FIG. 8B illustrates graphical user interface 700*b* depicting the assignment of seven additional maintenance resources and eight development resources to problem management for a two month period for Project 1 (710). The impact on the project portfolio's schedule, ROI (as ROI is driven by development activities), resourcing and costing are visible in the resource review information 740 and baseline information 750. The criticality of Project 1 (710) has also been increased.

To rebalance this project portfolio, the optimization objective of maximizing ROI is used along with a constraint that projects with the highest criticality must be scheduled. This means that the highest criticality projects are scheduled while also maximizing the ROI, ensuring as many development projects are scheduled as possible. Where there are insufficient resources that match the required technical and business domain knowledge skills mix projects can be deferred.

FIG. 8C illustrates graphical user interface 700*c* depicting, for example, the output of the optimization engine 260 that provides project portfolios optimized based on the objective of criticality and resource utilization. Project 1 (710) is scheduled with the additional resources required to address the incident levels. The remaining projects are scheduled according to their criticality level and ROI value, with the highest criticality and ROI projects being scheduled prior to those of lesser value or criticality, thus maximizing the ROI value to the business whilst ensuring that the most critical projects are met. In this case, Project 2 (720) was moved to start one month earlier and Project 3 (730) was pushed back one month.

Figure 9:
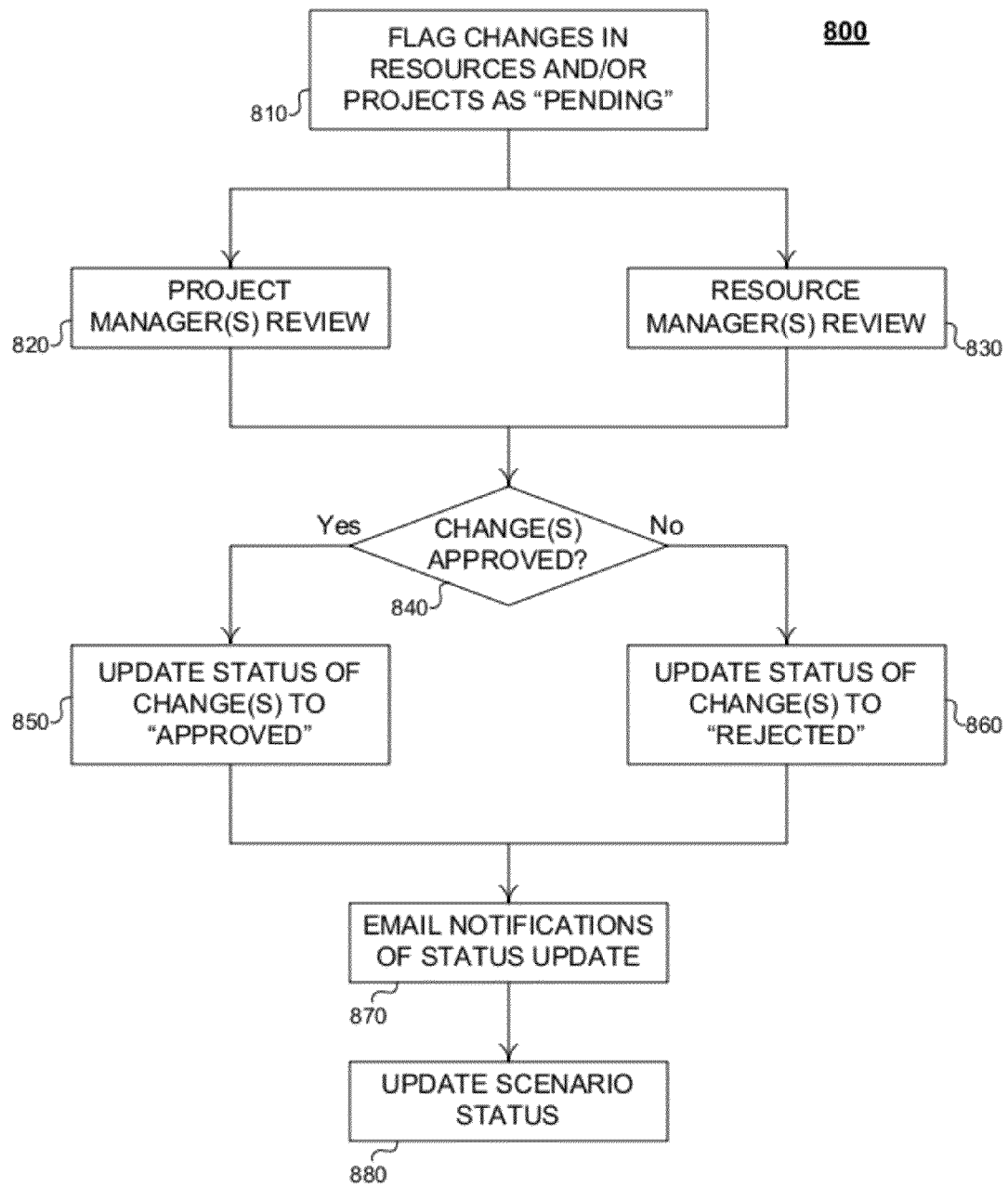
FIG. 9 illustrates a flowchart depicting a general process flow associated with approval of resource and/or project changes that result from the selection of a project allocation scenario.

FIG. 9 illustrates a flowchart 800 depicting a general process flow associated with approval of resource and/or project changes that result from the selection of a project allocation scenario according to some embodiments. In particular, flowchart 800 details a process (e.g., a handshake process) for implementing a simulated project portfolio allocation scenario. An action plain is first generated (160), which can include generating a set of data indicating the one or more changes necessary to move from the baseline state of the project portfolio to the desired project portfolio that was selected for implementation. Implementation of a project portfolio can include flagging changes in resource allocations and/or project scheduling as "pending" (810), sending flagged changes to project managers for review (820), sending flagged changes to resource managers for review (830), determining whether any change has been approved (840), updating the status of approved change(s) to be "approved" (850) and of unapproved change(s) to be "rejected" (860), emailing notifications of status updates (870), and/or updating the status of the project portfolio allocation scenario (880). In some embodiments, sending flagged changes to project managers for review (820) or resource managers for review (830) can be implemented using the handshake/organization data API 240 in order to interface with existing resource/project management systems 270 and/or HR management systems 280.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for optimizing allocation of resources across projects in a project portfolio, comprising:
receiving, at a computing device, (i) resource information, (ii) a portfolio of project definitions and (iii) one or more portfolio-level optimization criteria, the resource information representing a plurality of resources available for allocation to the projects, each project definition comprising a unique identifier and one or more project-level constraints;
generating, using the computing device, a plurality of project portfolio allocation scenarios by optimizing at least a first objective function and satisfying the one or more project-level constraints corresponding to each project definition, wherein generating each project portfolio allocation scenario comprises:
assigning a date value to each of the unique identifiers; and
allocating one or more of the plurality of resources to one or more of the unique identifiers, wherein the assignment of the date values and the allocation of the resources to the one or more unique identifiers satisfies the one or more project-level constraints associated with each project definition; and
determining, using the computing device, one or more optimized project portfolio allocation scenarios from the plurality of project portfolio allocation scenarios, wherein determining the one or more optimized project portfolio allocation scenarios optimizes a sequence of the projects by optimizing at least a second objective function and satisfying the one or more portfolio-level optimization criteria.

2. The computer-implemented method of claim 1 wherein determining the one or more optimized project portfolio allocation scenarios comprises:
   selecting, using the computing device, a first project portfolio allocation scenario from the plurality of the project portfolio allocation scenarios; and
   revising, using the computing device, the sequence of the projects in the first project portfolio allocation scenario to satisfy the one or more portfolio-level optimization criteria.

3. The computer-implemented method of claim 2 further comprising changing, using the computing device, the allocation of the resources in the first project portfolio allocation scenario to satisfy the one or more portfolio-level optimization criteria.

4. The computer-implemented method of claim 1 wherein determining the one or more optimized project portfolio allocation scenarios comprises:
   assigning, using the computing device, a weight to each of the one or more portfolio-level optimization criteria; and
   determining, using the computing device, the one or more optimized project portfolio allocation scenarios by satisfying the one or more portfolio-level optimization criteria scaled by their respective weights.

5. The computer-implemented method of claim 4 further comprising defining, using the computing device, at least one of the one or more project-level constraints, the one or more portfolio-level optimization criteria, and the weights based on one or more user inputs.

6. The computer-implemented method of claim 1 wherein the one or more project-level constraints comprise: one or more start dates or date ranges, one or more end dates or date ranges, one or more resource constraints, a cost constraint, one or more location constraints, or any combination thereof.

7. The computer-implemented method of claim 1 wherein the one or more optimization criteria comprising: a resource utilization criterion, a schedule criterion, a risk level criterion, a cost criterion, a return-on-investment criterion, an inter-project dependency criterion, or any combination thereof.

8. The computer-implemented method of claim 1 wherein the optimization criterion is a return-on-investment criterion.

9. The computer-implemented method of claim 1 further comprising generating an action plan based on the optimized project portfolio allocation scenario, the action plan comprising at least one of modifying resource allocation of the plurality of resources or acquiring additional resources.

10. The computer-implemented method of claim 1 wherein the plurality of resources comprise one or more human resources, one or more physical resources, or any combination thereof.

11. The computer-implemented method of claim 1 wherein the plurality of resources comprises one or more physical resources including one or more computer resources, one or more geographic locations, one or more supply materials, one or more equipment items, or any combination thereof.

12. The computer-implemented method of claim 1 wherein the resource information comprises attribute information for one or more of the plurality of resources.

13. The computer-implemented method of claim 12 wherein the attribute information comprises skills information, geographic location information, language information, availability information, or any combination thereof, for one or more human resources.

14. The computer-implemented method of claim 1 wherein each project definition from the portfolio of project definitions further includes information indicating a priority level.

15. The computer-implemented method of claim 14 wherein allocating one or more of the plurality of resources to one or more of the unique identifiers comprises allocating resources to a first unique identifier before allocating resources to a second unique identifier, wherein the first unique identifier is associated with a first priority level higher than a second priority level associated with the second unique identifier.

16. The computer-implemented method of claim 1 wherein assigning the date value to at least one of the unique identifiers comprises assigning, using the computing device, a null date value indicating that the project associated with the unique identifier is canceled or not scheduled.

17. The computer-implemented method of claim 1 wherein the portfolio of project definitions comprise a baseline set of project definitions and a new project definition, the resource information further including allocation information associating the plurality of resources with the baseline set of project definitions.

18. The computer-implemented method of claim 1 wherein the plurality of resources comprises a set of allocated resources and one or more unallocated resources, the resource information further including allocation information associating the set of allocated resources with the plurality of project definitions.

19. The computer-implemented method of claim 1 wherein the resource information comprises baseline allocation information associating the plurality of resources with the portfolio of project definitions.

20. The computer-implemented method of claim 1 wherein the at least first objective function and the at least second objective function are the same.

21. A computer program product, tangibly embodied in a non-transitory machine-readable storage device, for optimizing allocation of resources across projects, the computer program product including instructions being operable to cause data processing apparatus to:
   receive (i) resource information, (ii) a portfolio of project definitions, and (iii) one or more portfolio-level optimization criteria, the resource information representing a plurality of resources available for allocation to the projects, each project definition comprising a unique identifier and one or more project-level constraints;
   generate a plurality of project portfolio allocation scenarios by optimizing at least a first objective function and satisfying the one or more project-level constraints corresponding to each project definition, wherein the instructions that cause the data processing apparatus to generate each project allocation scenario comprise instructions that cause the data processing apparatus to:
      assign a date value to each of the unique identifiers; and
      allocate one or more of the plurality of resources to one or more of the unique identifiers, wherein the assignment of the date values and the allocation of the resources to the one or more unique identifiers satisfies the one or more project-level constraints associated with each project definition; and
   determine, using the data processing apparatus, one or more optimized project portfolio allocation scenarios from the plurality of project portfolio allocation scenarios, wherein determine the one or more optimized project portfolio allocation scenarios optimizes a sequence of the projects by optimizing at least a second objective function and satisfying the one or more portfolio-level optimization criteria.

22. The computer program product of claim 20 wherein the at least first objective function and the at least second objective function are the same.

* * * * *

UNITED STATES PATENT AND TRADEMARK OFFICE
CERTIFICATE OF CORRECTION

| | |
|---|---|
| PATENT NO. | : 8,214,240 B1 |
| APPLICATION NO. | : 13/190894 |
| DATED | : July 3, 2012 |
| INVENTOR(S) | : Morris et al. |

It is certified that error appears in the above-identified patent and that said Letters Patent is hereby corrected as shown below:

In the Claim:

In claim 22, at column 28, line 61, "claim 20" should read as --claim 21--

Signed and Sealed this
Ninth Day of October, 2012

David J. Kappos
*Director of the United States Patent and Trademark Office*